(12) United States Patent
Flitsch et al.

(10) Patent No.: US 10,466,506 B2
(45) Date of Patent: Nov. 5, 2019

(54) METHODS AND APPARATUS FOR BIOMEDICAL DEVICES WITH CUSTOMIZED APPEARANCE

(71) Applicant: Johnson & Johnson Vision Care, Inc., Jacksonville, FL (US)

(72) Inventors: Frederick A. Flitsch, New Windsor, NY (US); Randall B. Pugh, St. Johns, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 294 days.

(21) Appl. No.: 15/386,467

(22) Filed: Dec. 21, 2016

(65) Prior Publication Data

US 2018/0173008 A1  Jun. 21, 2018

(51) Int. Cl.
*G02C 7/04* (2006.01)
*G02C 7/10* (2006.01)
(Continued)

(52) U.S. Cl.
CPC ........ *G02C 7/046* (2013.01); *B29D 11/00038* (2013.01); *B29D 11/00048* (2013.01);
(Continued)

(58) Field of Classification Search
CPC .......... G02C 7/02; G02C 7/028; G02C 7/101; G02C 7/04; G02C 7/061; G02C 7/083; G02C 2202/20; G02C 2202/18; G02C 7/027; G02C 2202/16; G02C 2202/22; G02C 7/12; G02C 7/022; G02C 7/024; G02C 7/044; G02C 7/102; G02C 7/041; G02C 7/06; G02C 13/005; G02C 1/02; G02C 7/042; G02C 7/068; G02C 7/088; G02C 13/001; G02C 13/003; G02C 1/023; G02C 1/10; G02C 2202/10; G02C 2202/24; G02C 5/00; G02C 7/025; G02C 7/047; G02C 7/049; G02C 7/063; G02C 7/066; G02C 7/085; G02C 7/086; G02C 7/10; G02C 7/104; G02C 7/105; G02C 11/02; G02C 11/12; G02C 1/00; G02C 1/04; G02C 1/06; G02C 1/08; G02C 2200/02; G02C 2200/08; G02C 2202/02; G02C 2202/04;
(Continued)

(56) References Cited

U.S. PATENT DOCUMENTS

2002/0030788 A1  3/2002  Doshi
2002/0196409 A1  12/2002  Jani
(Continued)

FOREIGN PATENT DOCUMENTS

EP  1826018 A1  8/2007
EP  1826018 A4  2/2008
(Continued)

*Primary Examiner* — Collin X Beatty
*Assistant Examiner* — Grant A Gagnon

(57) ABSTRACT

Designs, apparatus and methods to form contact lenses with aesthetic elements on demand are described. In some examples, the method of defining the aesthetic aspect includes printing patterns. Other examples include photochromic or thermochromic elements which may provide patterning on exposure to electromagnetic irradiation. In some further examples, energized components in contact lenses may provide aesthetic characteristics.

6 Claims, 15 Drawing Sheets

(51) Int. Cl.
*B41J 2/01* (2006.01)
*B41J 3/407* (2006.01)
*B29D 11/00* (2006.01)
*G02F 1/13* (2006.01)
*G02B 26/08* (2006.01)

(52) U.S. Cl.
CPC ........... *B29D 11/00317* (2013.01); *B41J 2/01* (2013.01); *B41J 3/4073* (2013.01); *G02C 7/101* (2013.01); *G02C 7/102* (2013.01); *B29D 11/00653* (2013.01); *G02B 26/0833* (2013.01); *G02F 1/13* (2013.01)

(58) Field of Classification Search
CPC .. G02C 2202/08; G02C 2202/12; G02C 5/02; G02C 7/046; G02C 7/048; G02C 7/08; G02C 7/108; G02C 7/14; G02C 7/16; G02B 1/041; G02B 1/105; G02B 1/14; G02B 1/18; G02B 27/0006; G02B 1/115; G02B 27/0172; G02B 3/12; G02B 1/16; G02B 2027/011; G02B 2027/0178; G02B 27/0075; G02B 27/4211; G02B 3/02; G02B 3/04; G02B 3/08; G02B 3/14; G02B 5/208; G02B 13/146; G02B 17/08; G02B 1/06; G02B 1/10; G02B 1/11; G02B 1/113; G02B 1/116; G02B 1/12; G02B 2027/0123; G02B 25/001; G02B 25/004; G02B 26/004; G02B 26/06; G02B 27/0018; G02B 27/0025; G02B 27/0037; G02B 27/2228; G02B 3/00; G02B 3/0062; G02B 3/0081; G02B 3/0087; G02B 5/00; G02B 5/1866; G02B 5/1876; G02B 5/188; G02B 5/1885; G02B 5/1895; G02B 5/286; G02B 5/3025; G02B 5/3033; G02B 6/10; B29D 11/00009; B29D 11/0073; B29D 11/00461; B29D 11/00028; B29D 11/00134; B29D 11/00355; B29D 11/00865; B29D 11/00038; B29D 11/00125; B29D 11/00192; B29D 11/00413; B29D 11/00519; B29D 11/00634; B29D 11/00653; B29D 11/00817; B29D 11/00826; B29D 11/00942; B29D 12/02
USPC ............................................. 351/159
See application file for complete search history.

(56) References Cited

U.S. PATENT DOCUMENTS

| | | |
|---|---|---|
| 2011/0248415 A1 | 10/2011 | Alvarez-Carrigan et al. |
| 2012/0069254 A1 | 3/2012 | Burton |
| 2013/0083287 A1 | 4/2013 | Li et al. |
| 2013/0177703 A1 | 7/2013 | Clayton et al. |
| 2014/0259657 A1* | 9/2014 | Riall ............... B29D 11/00807 29/841 |
| 2014/0268015 A1* | 9/2014 | Riall ............... G02C 7/046 351/158 |
| 2014/0354942 A1 | 12/2014 | Pugh et al. |
| 2014/0354943 A1 | 12/2014 | Pugh et al. |
| 2014/0354946 A1 | 12/2014 | Pugh et al. |
| 2015/0138454 A1* | 5/2015 | Pugh ............... A61F 2/1627 349/13 |
| 2016/0299357 A1 | 10/2016 | Hayashi et al. |
| 2016/0306189 A1 | 10/2016 | Bowers et al. |

FOREIGN PATENT DOCUMENTS

| | | |
|---|---|---|
| EP | 1826018 B1 | 9/2008 |
| WO | WO2001040846 A2 | 6/2001 |
| WO | WO2001040846 A3 | 10/2001 |

* cited by examiner

130

140

150

160

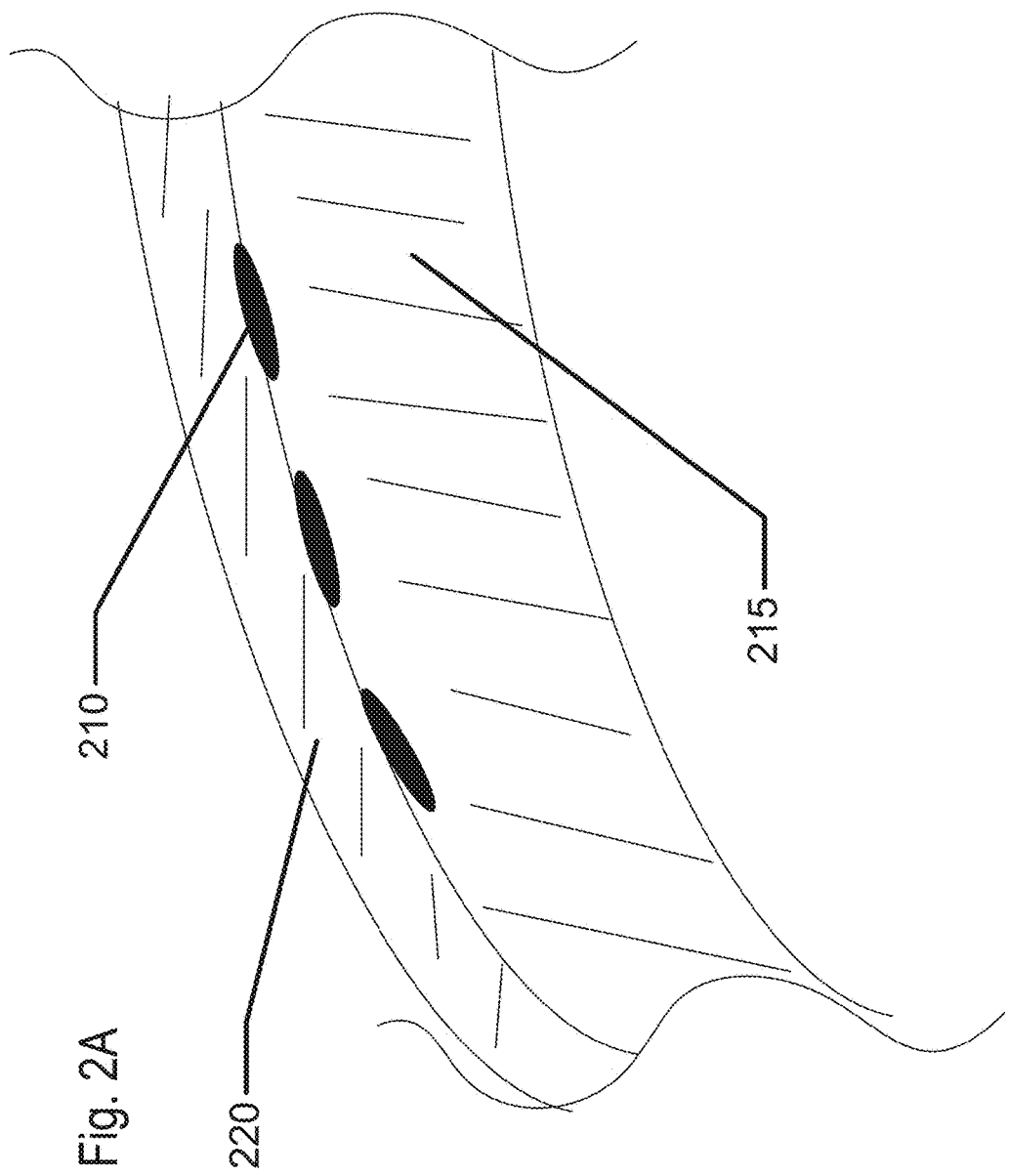

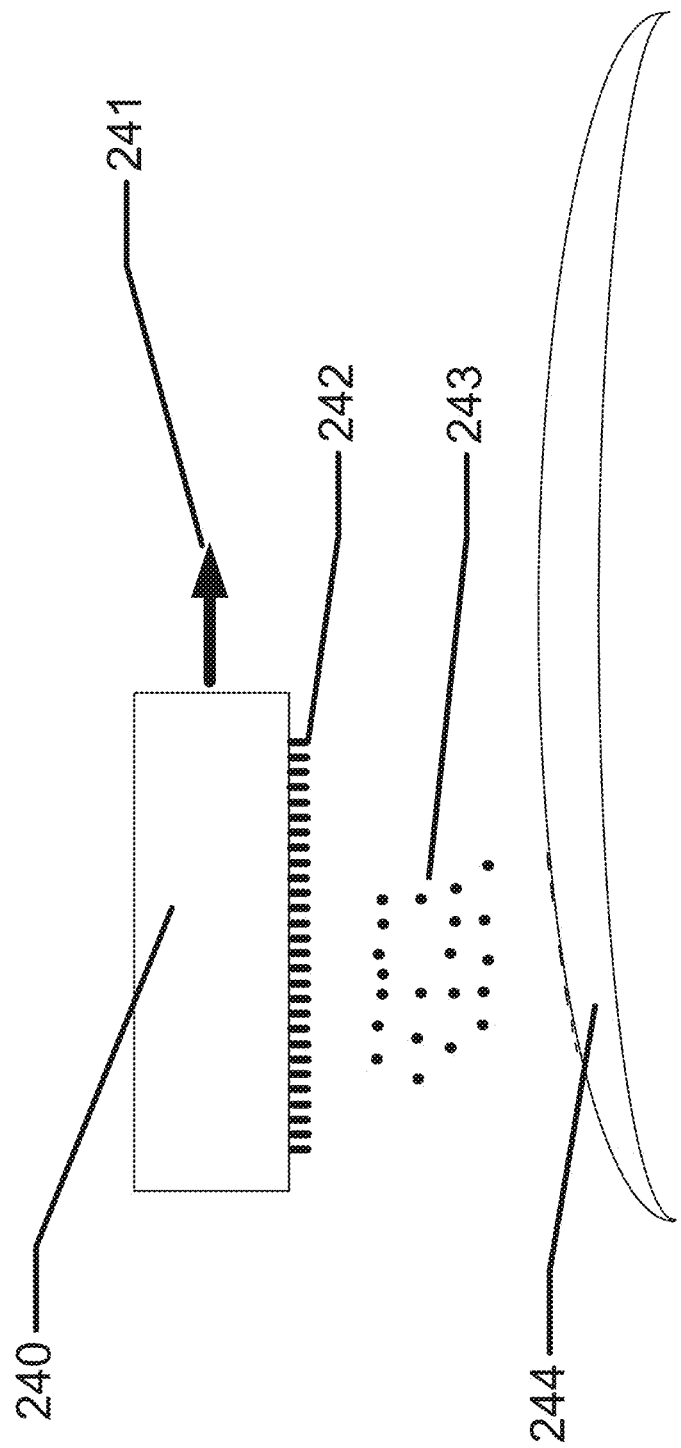

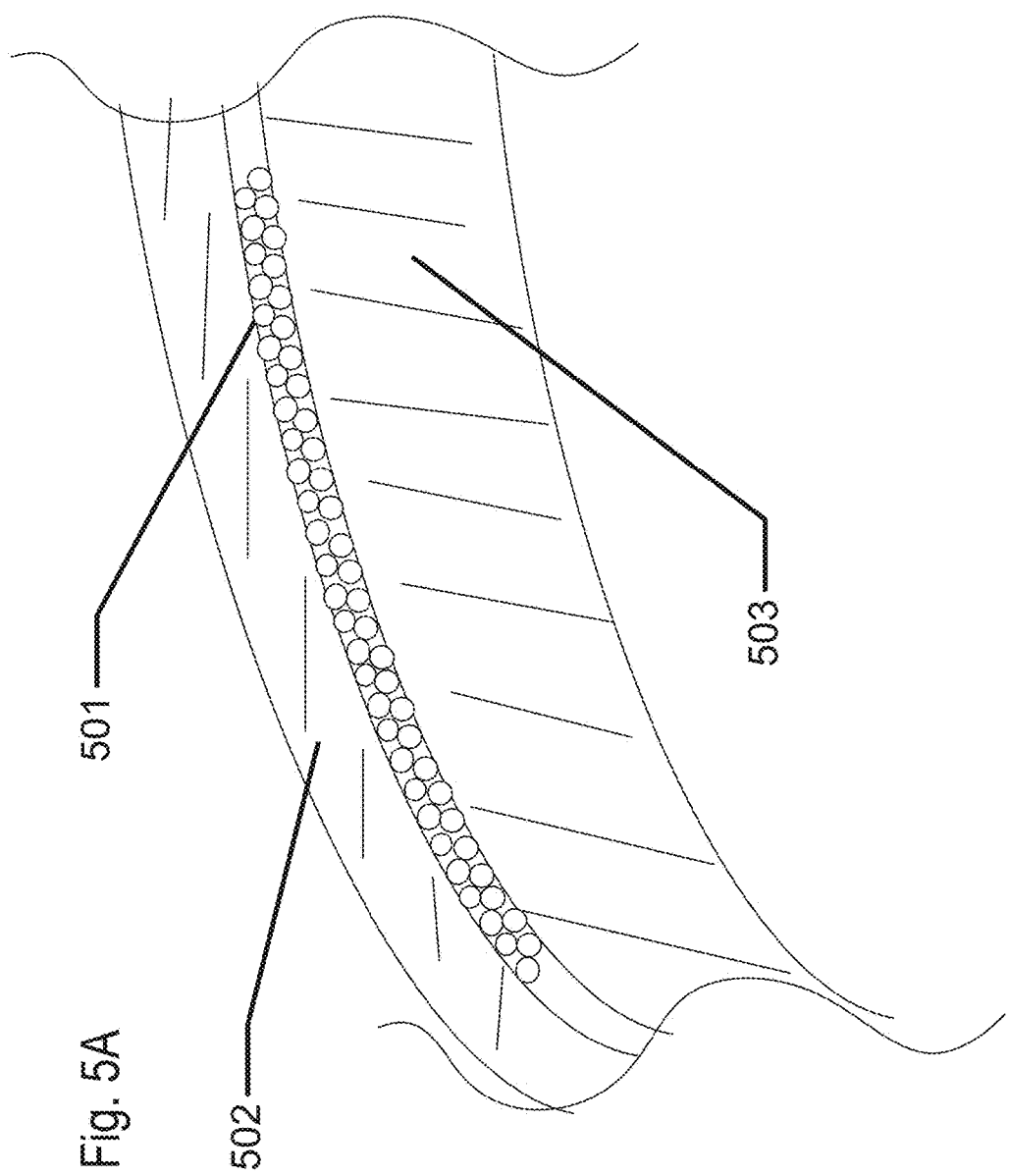

METHODS AND APPARATUS FOR BIOMEDICAL DEVICES WITH CUSTOMIZED APPEARANCE

BACKGROUND OF THE INVENTION

1. Field of the Invention

The present invention relates to methods and apparatus to construct and provide aesthetic content for contact lenses, along with apparatus and methods to provide individuals with that functionality.

2. Description of the Related Art

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses made or fabricated from hard materials were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeability values and are generally more comfortable to wear than the contact lenses made of the earlier hard materials. Rigid gas permeable hard contact lenses, on the other hand, are made from siloxane-containing polymers but are more rigid than soft contact lenses and thus hold their shape and are more durable.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a transparent or translucent tint that is meant to enhance one's natural eye color, the color tint contact lens comprises an opaque tint meant to change one's eye color, and the light filtering tint contact lens functions to enhance certain colors while muting others. Bifocal and multifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Cosmetic contact lenses may comprise patterns composed of one or more elements that completely, or more preferably, partially overlie the wearer's iris. These lenses may also comprise a limbal ring. A limbal ring is essentially an annular band of color that when the lens is on the eye and centered, partially or completely overlies the lens wearer's limbal region which is the junction of the sclera and the cornea. The inclusion of a limbal ring may make the iris appear larger, darker and/or more defined. The combination of the limbal ring and an iris pattern makes the appearance of the lens on eye more natural. In other words, an iris pattern allows the limbal ring to blend in naturally with the wearer's eyes and the combination of an iris pattern and a limbal ring creates blending, depth, contrast and definition.

Other cosmetic contact lenses focus on the sclera rather than or in addition to the iris. For example, a contact lens may comprise a brightly colored peripheral portion, i.e. outside of the iris region, that may be opaque, semi-opaque and/or translucent. The bright portion may extend from the edge of the limbus to the edge of the contact lens creating the impression of a brighter or whiter sclera. These contact lenses may also include a limbal ring which as stated above, may make the iris appear larger, darker and/or more defined than it would otherwise.

With developments in fabrication technology for contact lenses, customized lenses may be readily available at lower cost. While this customization may relate to the geometry of the lens, constructing the lens to an individual's prescription for example, then further customization options may also be possible. An example of these possible customization options may include aesthetic, rather than purely functional or geometric, options. A notable aesthetic customization need may include pigmentation of a contact lens; this may achieve various aesthetic qualities for a wearer, including changing the apparent eye color of the wearer, or masking the eye with special and possibly intricate aesthetic patterns.

Due to the decreasing costs and increasing manufacturability of customized lenses, the means by which they are sold has similarly evolved. As a notable example, patterned lenses are particularly popular among teenage girls in many parts of the world. Many of these girls use lenses which do not provide any visual correction, the function of the lenses is purely aesthetic. Shops and kiosks exist in malls and stores that may sell thousands of different aesthetic based lenses, allowing for large selection. These lenses may not always be of the highest quality, but their appeal may be their relative uniqueness. With relative ease, an individual can own a set of lenses that is different from all of their friends. There may be so many options that it may be difficult for a user's friends to even find the same pair of lenses, and this uniqueness, the fact that the special pattern can be 'theirs', is useful. Nevertheless, there may be needs to further enhance the ability of users to obtain unique designs and potentially even participate in the design of the lenses.

As mentioned earlier, there may be some reduction of the quality of the lenses that are currently being afforded. Hereto, an ability to provide aesthetic customization while also providing high levels of quality is desirable. Such lenses may provide the aesthetic aspect while protecting such quality aspects as user comfort and safety.

Accessibility of recent technologies, from instant online access to television shows nearly anywhere with the push of a button, to additive manufacturing allowing for the printing of customized 3D objects in the comfort of one's home, have evolved to grant the ability for consumers to instantly access the products or services they desire on demand. It may be desirable to provide for similar methods to provide customized high quality lenses with aesthetic characteristics along with high quality and safety.

SUMMARY OF THE INVENTION

Accordingly, designs and methods for devices to construct customized contact lenses with an aesthetic characteristic are described herein.

One general aspect includes a device that allows for a user to aestheticize a contact lens or set of contact lenses. This process of aestheticizing a lens may include printing or otherwise dispensing ink or other dye that is pigmented, phosphorescent, luminescent, or otherwise able to cause a visible change to a contact lens under various wavelengths of light.

One general aspect includes a contact lens device including: a hydrogel base, where a lower surface of the hydrogel base is shaped to comfortably fit on a surface of a user's cornea; and an element that imparts a color to a location within a body of the contact lens, where the location of the element that imparts a color and a nature of the color at that location is determined by interaction of the user with a software program which displays an image of a pattern of color.

Implementations may include one or more of the following features. The contact lens device where the determination of the location of the element that imparts a color is made before the element that imparts a color is placed. The element that imparts a color may use ink to impart the color. In some examples, the ink is printed onto the contact lens with an inkjet printer. In other examples, the ink is placed within the contact lens by a needle. In an embodiment, the element that imparts a color includes a photochromic dye. For embodiments with photochromic dyes, the dye may be turned color by an exposure to ultraviolet radiation. The contact lens device further includes a second layer of polymeric material, where the second layer of polymeric material lies above the element that imparts a color and together with the hydrogel base encapsulates the element that imparts a color.

In some embodiments a contact lens device includes an insert device, where the insert device is encapsulated within the hydrogel base, and where the insert device includes embedded micronized pieces of polymer where a photochromic dye is located within the micronized pieces of polymer. The micronized pieces may range in size from tens of nanometers to approximately 100 microns. In order to impart a pattern to a contact lens which comprises micronized pieces a contact lens pattern imaging device may be used which controllably irradiates select regions of the micronized pieces of polymer comprising a photochromic dye. In some examples, the contact lens pattern imaging device includes a light source which irradiates in the ultraviolet spectrum. The contact lens pattern imaging device may also have functionality where the light source sources multiple discrete bands of radiation in an ultraviolet region, and where the multiple discrete bands of radiation are used to pattern multiple different colors within the pattern in the contact lens. The contact lens pattern imaging device may include different types of imaging apparatus including where the light intensity modulator includes a layer of liquid crystal material. In these examples, the layer of liquid crystal material lies between electrodes, and application of an electrical signal to the electrodes modulates an intensity of light that passes through the imaging device in a region bounded by the electrodes. In some examples, the contact lens pattern imaging device may use a DMD device to control the light intensity at select locations of the contact lens.

In some implementations, the method of forming a custom patterned contact lens may include imparting a colorant to a contact lens base by printing an ink upon the contact lens base. In a variation, the imparting of the colorant to the contact lens base is performed by penetrating the contact lens base with needles, where the needle is coated with an ink.

In some implementations, the method of imparting the colorant to the contact lens base is performed by irradiating a photochromic dye, where the photochromic dye is located within a body of the contact lens base. In similar implementations, the imparting of the colorant to the contact lens base is performed by irradiating a thermochromic dye, where the thermochromic dye is located within a body of the contact lens base. Implementations of the described techniques may include hardware, a method or process, or computer software on a computer-accessible medium.

One general aspect includes a contact lens pattern imaging device where the contact lens pattern imaging device includes the following: a receptacle configured to hold a package containing a pair of contact lens bases, where the contact lens base includes an imbedded photochromic dye, and where the receptacle holds the pair of contact lens bases in an aligned location; a light source, where the light source is located within the contact lens pattern imaging device in a position to illuminate the pair of contact lens bases in their aligned positions; a light intensity modulator, where the light intensity modulator blocks portions of the light from the light source in a pattern; a controller, where the controller sends control information to the light intensity modulator to turn elements within the light intensity modulator on and off to form the pattern; and a communication device, where the communication device receives communication of data and passes it on to the light intensity modulator. Other embodiments of this aspect include corresponding computer systems, apparatus, and computer programs recorded on one or more computer storage devices, each configured to perform the actions of the methods.

Implementations may include one or more of the following features. The contact lens pattern imaging device may include a light source which sources ultraviolet radiation. The contact lens pattern imaging device may include a light source which sources multiple discrete bands of radiation in an ultraviolet region, and where the multiple discrete bands of radiation are used to pattern multiple different colors within the pattern in the contact lens. The contact lens pattern imaging device may include a light intensity modulator which includes a layer of liquid crystal material, where the layer of liquid crystal material lies between electrodes, and where an electrical signal applied to the electrodes modulates an intensity of light that passes through the imaging device in a region bounded by the electrodes. The contact lens pattern imaging device may include a light intensity modulator which includes a DMD device.

One general aspect includes a contact lens patterning device including: a receptacle configured to hold a package containing a pair of contact lens bases, where the contact lens base includes a surface treatment that makes the surface adherent to ink droplets; a first print head printing element, where the first print head printing element is located within the contact lens patterning device in a position to print directly upon the pair of contact lens bases in their aligned positions, and where the first print head printing element prints ink; a second print head printing element, where the second print head printing element is located within the contact lens patterning device in a position to print directly upon the pair of contact lens bases in their aligned positions, and where the second print head printing element prints a reactive monomer mixture; a controller, where the controller sends control information to the print head to turn elements within the print head on and off to form a pattern of ink droplets; and a communication device, where the communication device receives communication of data into the controller. Other embodiments of this aspect include corresponding computer systems, apparatus, and computer programs recorded on one or more computer storage devices, each configured to perform the actions of the methods.

One general aspect includes a method of forming a pattern within a contact lens, the method including: forming a contact lens base, where the forming includes molding; placing the contact lens base into a package for storage; interacting with a design system to select a pattern design; imparting a colorant to the contact lens base; depositing a monomer mixture upon the contact lens base, where the monomer mixture surrounds an exposed surface of the colorant; and fixing the monomer mixture by polymerization/. Other embodiments of this aspect include corresponding computer systems, apparatus, and computer programs recorded on one or more computer storage devices, each configured to perform the actions of the methods.

One general aspect includes a method of displaying a pattern in a contact lens including: forming a contact lens including: an insert device, the insert device including: an energization element; an electroactive layer including an aligned liquid crystal material surrounded by a first and second electrode, where an application of an electrical potential across the first and second electrode changes an orientation of molecules of the liquid crystal material which reduces a transmission of electromagnetic radiation through contact lens, and where the electroactive layer is located in a non-optic zone of the contact lens; a controller, where the controller controls the electrical potential that is applied across the first electrode and the second electrode; and a communication device, where the communication device receives data relating to a pattern that determines whether the electrical potential is applied by the controller; transmitting a communication from an external device to the communication device within the contact lens; and placing the contact lens upon an eye of a user. Other embodiments of this aspect include corresponding computer systems, apparatus, and computer programs recorded on one or more computer storage devices, each configured to perform the actions of the methods.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 2A illustrates a cross section close-up view of an exemplary lens with aesthetic characteristics.

FIG. 2C illustrates a close-up view of an exemplary apparatus printing an aesthetic characteristic on an exemplary lens.

FIG. 5A illustrates an exemplary cross section view of a lens base comprising photochromic or thermochromic dye.

DETAILED DESCRIPTION OF THE INVENTION

Figure 1A:
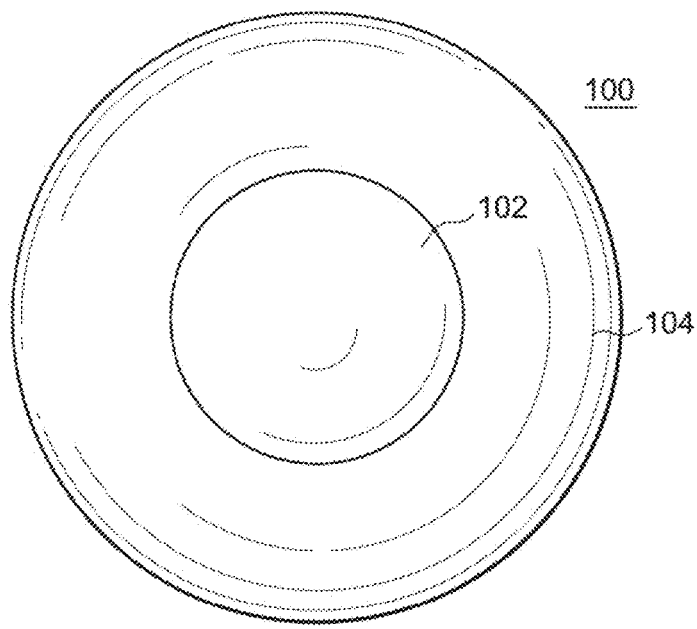
FIGS. 1A-1G illustrate exemplary lenses with aesthetic characteristics.

Designs and methods for various embodiments of a device to construct and/or aestheticize customized contact lenses have been disclosed. The descriptions of examples are exemplary embodiments only, and various modifications and alterations may be apparent to those skilled in the art. Therefore, the examples do not limit the scope of this application.

Glossary

In the description and claims below, various terms may be used for which the following definitions will apply:

"Actinic Radiation" as used herein, refers to radiation that is capable of initiating a chemical reaction.

"Arcuate" as used herein, refers to a curve or bend like a bow.

"DMD" as used herein, refers to a digital micro-mirror device that is a bistable spatial light modulator consisting of an array of movable micro-mirrors functionally mounted over a CMOS SRAM. Each mirror is independently controlled by loading data into the memory cell below the mirror to steer reflected light, spatially mapping a pixel of video data to a pixel on a display. The data electrostatically controls the mirror's tilt angle in a binary fashion, where the mirror states are either +X degrees (on) or −X degrees (off). For current devices, X can be either 10 degrees or 12 degrees (nominal). Light reflected by the on mirrors then is passed through a projection lens and onto a screen. Light is reflected off to create a dark field, and defines the black-level floor for the image. Images are created by gray-scale modulation between on and off levels at a rate fast enough to be integrated by the observer. The DMD (digital micro-mirror device) is sometimes referred to as a DLP projection system.

"DMD Script" as used herein shall refer to a control protocol for a spatial light modulator and also to the control signals of any system component, for example, a light source or filter wheel either of which may include a series of command sequences in time. Use of the acronym DMD is not meant to limit the use of this term to any one particular type or size of spatial light modulator.

"Fixing Radiation" as used herein, refers to Actinic Radiation sufficient to one or more of: polymerize and crosslink essentially all Reactive Mixture comprising a Lens Precursor or lens.

"Fluent Lens Reactive Media" as used herein means a Reactive Mixture that is flowable in either its native form, reacted form, or partially reacted form and is formed upon further processing into a part of an ophthalmic lens.

"Gel Point" as used herein shall refer to the point at which a gel or insoluble fraction is first observed. Gel point is the extent of conversion at which the liquid polymerization mixture becomes a solid. Gel point can be determined using a soxhlet experiment: Polymer reaction is stopped at different time points and the resulting polymer is analyzed to determine the weight fraction of residual insoluble polymer. The data can be extrapolated to the point where no gel is present. This point where no gel is present is the gel point. The gel point may also be determined by analyzing the viscosity of the reaction mixture during the reaction. The viscosity can be measured using a parallel plate rheometer, with the reaction mixture between the plates. At least one plate should be transparent to radiation at the wavelength used for polymerization. The point at which the viscosity approaches infinity is the gel point. Gel point occurs at the same degree of conversion for a given polymer system and specified reaction conditions.

"Lens" as used herein refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses made from silicone elastomers or hydrogels, which include but are not limited to silicone hydrogels, and fluorohydrogels.

"Lens Precursor" as used herein, means a composite object consisting of a Lens Precursor Form and a Fluent Lens Reactive Mixture in contact with the Lens Precursor Form. For example, in some embodiments Fluent Lens Reactive Media is formed in the course of producing a Lens Precursor Form within a volume of Reactive Mixture. Separating the Lens Precursor Form and adhered Fluent Lens Reactive Media from the volume of Reactive Mixture used to produce the Lens Precursor Form can generate a Lens Precursor. Additionally, a Lens Precursor can be converted to a different entity by either the removal of significant amounts of Fluent Lens Reactive Mixture or the conversion of a significant amount of Fluent Lens Reactive Media into non-fluent incorporated material.

"Lens Precursor Form" as used herein, means a non-fluent object with at least one optical quality surface which is consistent with being incorporated upon further processing into an ophthalmic lens.

"Lens Forming Mixture," "Reactive Mixture" or "RMM" (reactive monomer mixture) as used herein refers to a monomer or prepolymer material which can be cured and crosslinked or crosslinked to form an ophthalmic lens. Various embodiments can include lens forming mixtures with one or more additives such as: UV blockers, tints, photoinitiators or catalysts, and other additives one might desire in an ophthalmic lens such as, contact or intraocular lenses.

"Mold" as used herein, refers to a rigid or semi-rigid object that may be used to form lenses from uncured formulations. Some preferred molds include two mold parts forming a front curve mold part and a back curve mold part.

"Optical Zone" as used herein refers to an area of an ophthalmic lens through which a wearer of the ophthalmic lens sees.

"Released from a mold" means that a lens is either completely separated from the mold, or is only loosely attached so that it can be removed with mild agitation or pushed off with a swab.

"Xgel" as used herein, is the extent of chemical conversion of a crosslinkable Reactive Mixture at which the gel fraction becomes greater than zero.

Exemplary Aesthetic Modification of Contact Lenses

Referring now to FIG. 1A, there is illustrated a plan view of an exemplary non-cosmetic contact lens 100. The contact lens 100 comprises an optic zone 102, a peripheral zone 104 surrounding the optic zone 102, a back curve surface designed to make contact with an individual's eye when worn and a front curve surface opposite the back curve surface. The optic zone 102 is the portion of the contact lens 100 through which vision correction may be obtained. In other words, the optic zone 102 provides vision correction and is designed for a specific need such as single vision myopia or hyperopia correction, astigmatism vision correction, bi-focal vision correction, multi-focal vision correction, custom correction or any other design that may provide vision correction. The peripheral zone 104 surrounds the optic zone 102 and provides mechanical stability for the contact lens 100 on the eye. In other words, the peripheral zone 104 provides mechanical features which influence positioning and stabilization of the contact lens 100 on the eye, including centration and orientation. Orientation is fundamental when the optic zone 102 includes non-rotationally symmetric features, such as astigmatic correction and/or high order aberration correction. In some contact lens designs, an optional intermediate zone between the optic zone 102 and the peripheral zone 104 may be utilized. The optional intermediate zone ensures that the optic zone 102 and the peripheral zone 104 are smoothly blended.

The lens 100 illustrated in FIG. 1A is circular, but may be any convenient shape for a contact lens, such as an elliptical or truncated circular shape. In addition to being round or non-round, the contact lens 100 may be planar or non-planar.

A cosmetic contact lens is designed to enhance or alter the appearance of the eye upon which it is worn. While not a requirement, cosmetic contact lenses may also be utilized for the correction of refractive error. In addition, cosmetic contact lenses may also have direct medical application, for example, to restore the appearance of a damaged eye. Individuals who suffer from aniridia, the absence of an iris, dyscoria, damage of the iris, and/or arcus senilis or arcus senilus corneae, a disorder that lightens or discolors the limbus area, may utilize colored contact lenses that will give the appearance of a complete iris. Cosmetic contact lenses may include translucent/transparent color enhancement, tint, opaque color tint, artificial iris patterns, limbal rings, sclera brightening tints and/or any combination of the above.

More specifically, cosmetic contact lenses may be utilized to brighten the sclera and/or have a pattern that includes a limbal ring that serves to enhance the definition of the wearer's iris resulting in the iris appearing larger to viewers of the lens wearer. Additionally, cosmetic contact lenses may have additional pattern elements that completely or, preferably, partially overlie the wearer's iris. The cosmetic lenses may be utilized for enhancing a dark-eyed individual's iris, but also may be used to enhance the iris of a light-eyed lens wearer as well.

Figures 1B, 1C:
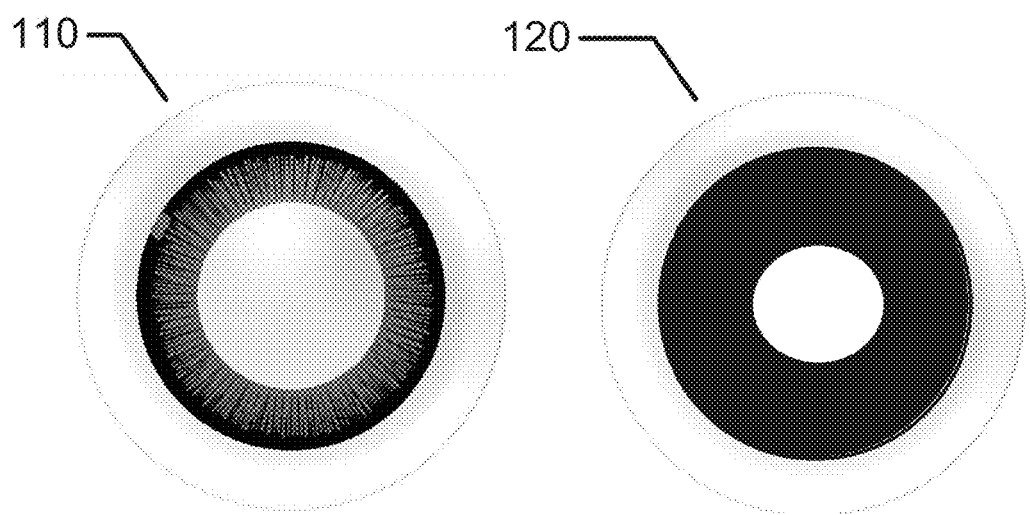

Referring to FIG. 1B, an example of aesthetic modification of contact lenses 110 that has been previously described by the inventive entity of the present disclosure is illustrated. The example illustrates an exemplary iris pattern that is printed upon an insert that is encapsulated into a hydrogel skirt to form a contact lens as is explained in greater detail herein. The internal electronic and energization components are aesthetically covered with the iris pattern when a user wears the contact lens.

In other examples, a printed pattern in a contact lens may have the sole function of providing an appearance when worn and may be printed on a contact lens body that has no internal components. Referring to FIG. 1C, a contact lens with aesthetic modification 120 is illustrated where the aesthetic modification may be a solid printed pattern that may give the impression of a large pupil.

Figure 1D:
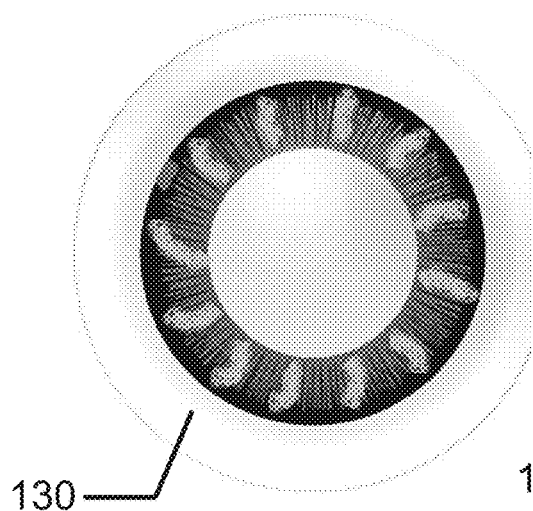
Figure 1E:
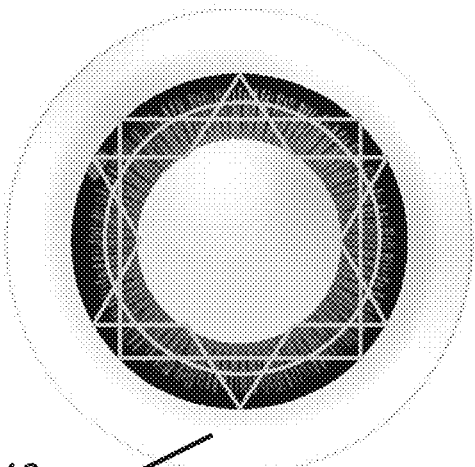
Figure 1F:
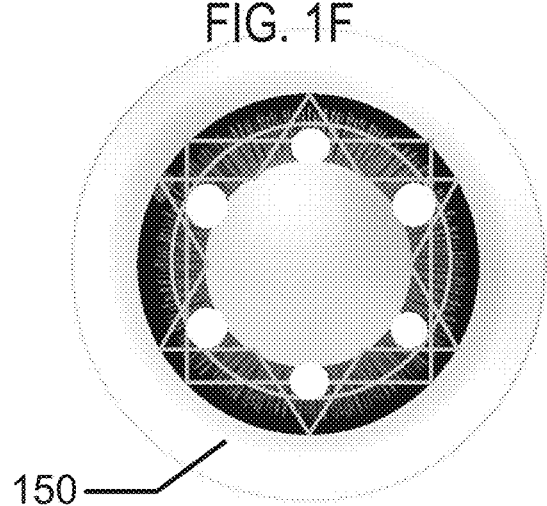

As mentioned previously, there may be an immense number of patterns that may be applied to contact lenses for aesthetic patterning. Referring to FIGS. 1D, 1E and 1F variations on an iris pattern are illustrated with brush strokes 130, line patterns 140 and combinations of line patterns and geometric shapes 150. These patterns may invoke a more artificial lens appearance than some of the more standard aesthetic modifications as shown in FIGS. 1B and 1C.

Further enablement for manufacturing of lenses with predesigned aesthetic patterning may be found as set forth in U.S. patent application Ser. No. 14/687,321 filed Apr. 15, 2015, which is incorporated herein by reference.

Figure 1G:
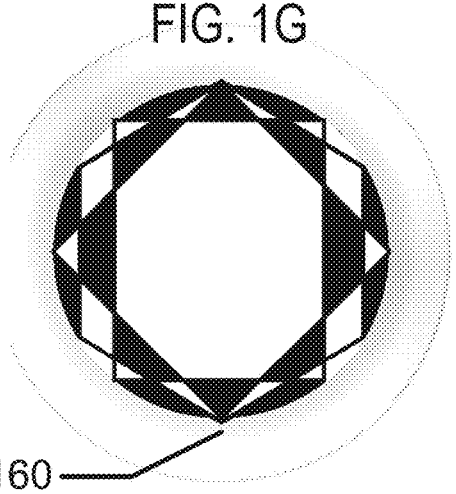

Patterns may be formed that have only patterns with no reference to normal features like iris patterns. Referring to FIG. 1G an example of a graphic pattern 160 is illustrated. In many examples, arbitrary patterns of monochrome or multicolors may be fabricated to give a user a unique appearance when others look at their eyes. As mentioned earlier, examples of such aesthetic lenses may be formed where there is to optical modifying characteristic of the contact lens, the lens may be used merely to give the aesthetic effect.

Fabrication of Comfortable Contact Lenses with Aesthetic Content

Referring to FIG. 2A an exemplary cross section of a lens with aesthetic content is illustrated. A base layer 215 of the lens may be formed into a lens body. The formation may occur in numerous manners that are standard in the manufacture of contact lenses including molding of polymerizable materials between mold surfaces to form a shaped body in an appropriate form for a contact lens.

There may be numerous types of materials that may be used to form the base layer 215. In some examples, a preferred base material and in other examples which have an insert device in the contact lens an encapsulating material may include a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some examples, the ophthalmic lens skirt, also called an insert-encapsulating layer, that surrounds an insert may be comprised of standard hydrogel ophthalmic lens formulations. Exemplary materials with characteristics that may provide an acceptable match to numerous insert materials may include, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims and by the same logic may form an acceptable base layer on examples of contact lenses without inserts.

Suitable silicone containing components include compounds of Formula I

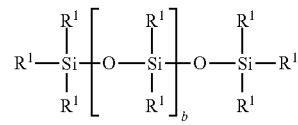

where

R1 is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one R1 comprises a monovalent reactive group, and in some examples between one and 3 R1 comprise monovalent reactive groups.

As used herein "monovalent reactive groups" are groups that may undergo free radical and/or cationic polymerization. Non-limiting examples of free radical reactive groups include (meth)acrylates, styryls, vinyls, vinyl ethers, C1-6alkyl(meth)acrylates, (meth)acrylamides, C1-6alkyl (meth)acrylamides, N-vinyllactams, N-vinylamides, C2-12alkenyls, C2-12alkenylphenyls, C2-12alkenylnaphthyls, C2-6alkenylphenylC1-6alkyls, O-vinylcarbamates and O-vinylcarbonates. Non-limiting examples of cationic reactive groups include vinyl ethers or epoxide groups and mixtures thereof. In one embodiment the free radical reactive groups comprise (meth)acrylate, acryloxy, (meth)acrylamide, and mixtures thereof.

Suitable monovalent alkyl and aryl groups include unsubstituted monovalent C1 to C16alkyl groups, C6-C14 aryl groups, such as substituted and unsubstituted methyl, ethyl, propyl, butyl, 2-hydroxypropyl, propoxypropyl, polyethyleneoxypropyl, combinations thereof and the like.

In one example, b is zero, one R1 is a monovalent reactive group, and at least 3 R1 are selected from monovalent alkyl groups having one to 16 carbon atoms, and in another example from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl] propoxy]propyl ester ("SiGMA"), 2-hydroxy-3-methacryloxypropyloxypropyl-tris (trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another example, b is 2 to 20, 3 to 15 or in some examples 3 to 10; at least one terminal R1 comprises a monovalent reactive group and the remaining R1 are selected from monovalent alkyl groups having 1 to 16 carbon atoms, and in another embodiment from monovalent alkyl groups having 1 to 6 carbon atoms. In yet another embodiment, b is 3 to 15, one terminal R1 comprises a monovalent reactive group, the other terminal R1 comprises a monovalent alkyl group having 1 to 6 carbon atoms and the remaining R1 comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another example, b is 5 to 400 or from 10 to 300, both terminal R1 comprise monovalent reactive groups and the remaining R1 are independently selected from monovalent alkyl groups having 1 to 18 carbon atoms, which may have ether linkages between carbon atoms and may further comprise halogen.

In one example, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another embodiment, one to four R1 comprises a vinyl carbonate or carbamate of the formula:

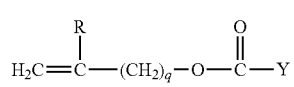

Formula II wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl] propyl allyl carbamate; 3-[tris (trimethylsiloxy)silyl] propyl vinyl carbamate; trimethylsilylethyl vinyl carbonate; trimethylsilylmethyl vinyl carbonate, and

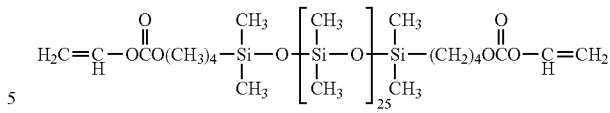

Where biomedical devices with modulus below about 200 are desired, only one R1 shall comprise a monovalent reactive group and no more than two of the remaining R1 groups will comprise monovalent siloxane groups.

Another class of silicone-containing components includes polyurethane macromers of the following formulae:

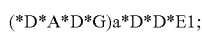

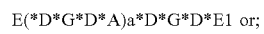

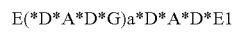   Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a is at least 1;

A denotes a divalent polymeric radical of formula:

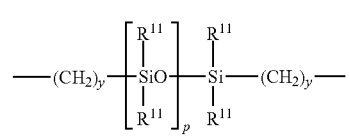   Formula VII

R11 independently denotes an alkyl or fluoro-substituted alkyl group having 1 to10 carbon atoms, which may contain ether linkages between carbon atoms; y is at least 1; and p provides a moiety weight of 400 to 10,000; each of E and E1 independently denotes a polymerizable unsaturated organic radical represented by formula:

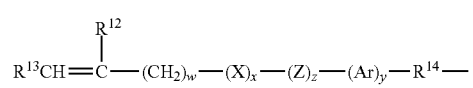   Formula VIII wherein: R12 is hydrogen or methyl; R13 is hydrogen, an alkyl radical having 1 to 6 carbon atoms, or a —CO—Y—R15 radical wherein Y is —O—, Y—S— or —NH—; R14 is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

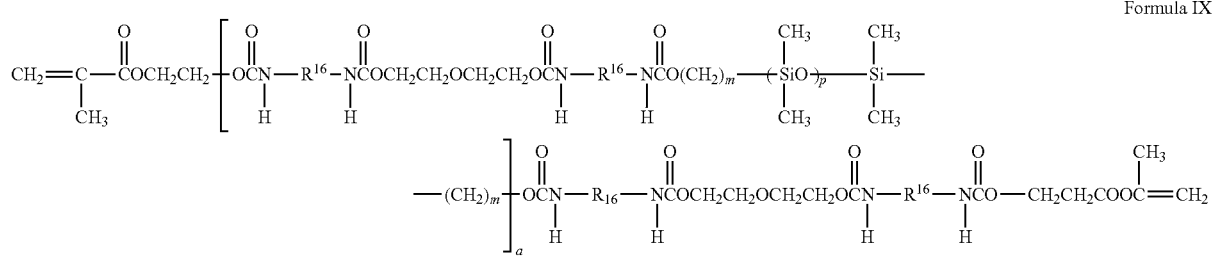

Formula IX wherein R16 is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

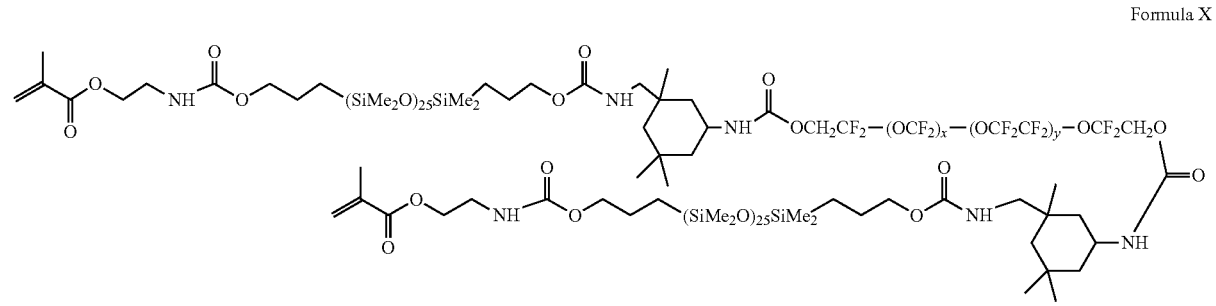

Formula X

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. In some examples, the polymer backbone may have zwitterions incorporated into it. These zwitterions may exhibit charges of both polarity along the polymer chain when the material is in the presence of a solvent. The presence of the zwitterions may improve wettability of the polymerized material. In some examples, any of the foregoing polysiloxanes may also be used as an encapsulating layer in the present invention.

Referring again to FIG. 2A, a colored material may be used to create the aesthetic element 210. In the following sections numerous means to place colored material into or upon the surface of the base element of a contact lens are described. These means may be used to embed color into the contact lens or deposit the color onto the surface. The color may include a black ink or other various colors that may be formed from inks, dyes and other colorants that are safe in the ocular environment. After the aesthetic element 210 is formed in or upon the base layer 215, it may be encapsulated by a top coating layer 220. In other examples, where the colorants are implanted into the base layer, the top coating layer may represent the depth through which the colorant is implanted.

In examples where a top coating layer may be applied, a silicone hydrogel formulation containing polymeric wetting agents, such as poly(N-vinylpyrrolidone) (PVP) and acyclic polyamides may be used. In some examples, these polymers may be quite large and may require the use of special compatibilizing components, which need to be custom manufactured. Examples of compatibilizing components may include 2-propenoic acid, 2-methyl-,2-hydroxy-3-[3-[1,3,3,3-tetramethyl-1-[(trimethylsilyl)oxy]disi-loxanyl] propoxy]propyl ester (SiGMA). The top coat comprising monomeric form and polymeric wetting agents may be applied and then may be further polymerized.

Method to Form Aesthetic Lenses with Ink Printing

Figure 2B:
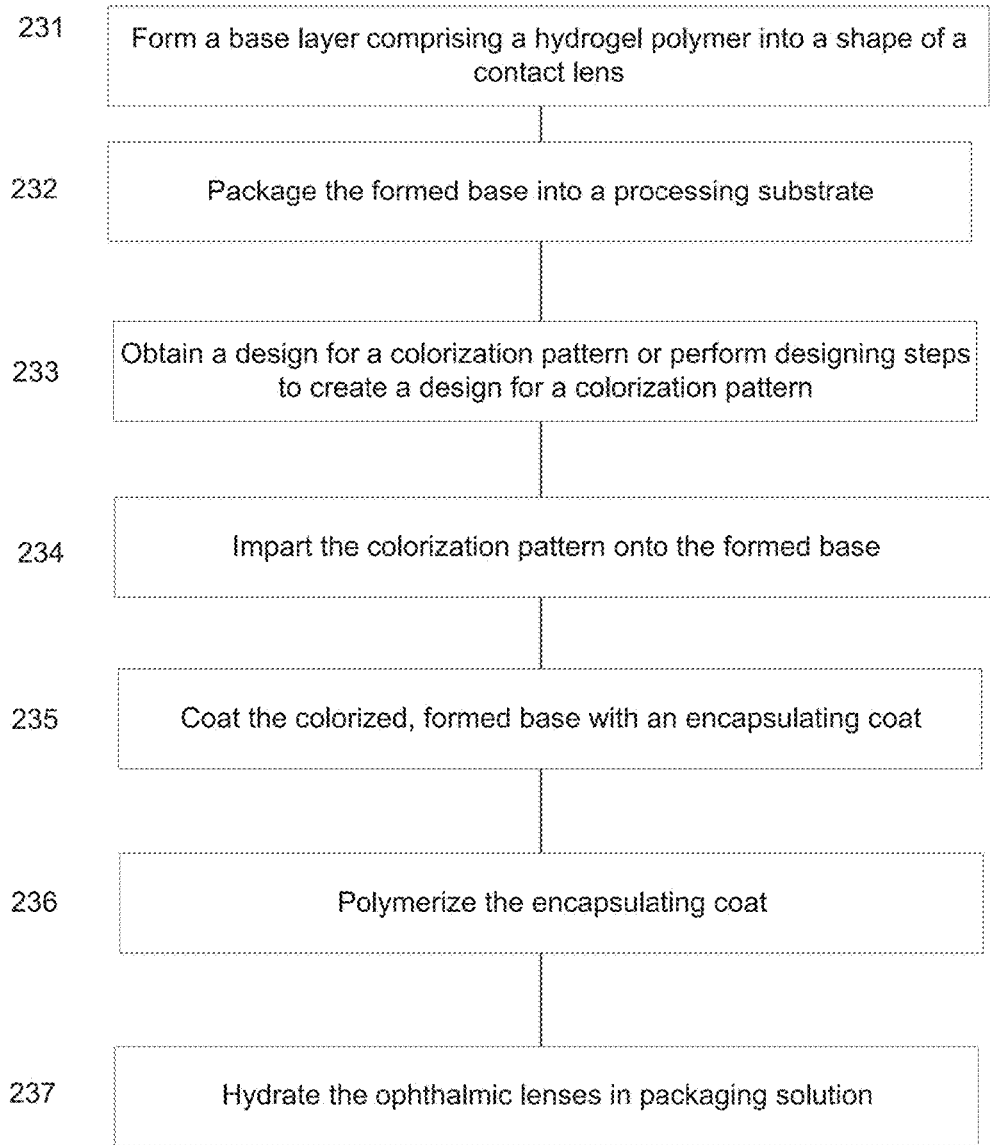
FIG. 2B illustrates a flow chart of an exemplary method for producing an exemplary lens with aesthetic characteristics.

Referring to FIG. 2B, a method for forming aesthetic lenses is illustrated. At step 231 a contact lens base is formed. The method to form the base may be drawn from known methods in the art including cast molding, lens machining and freeform deposition as examples. In some examples, the lens back curve surface may be fully defined in step 231 whereas the front curve surface may be covered with subsequent coatings. At step 232 the contact lens base may be placed into packaging for storage of the lens base until an aesthetic element is applied. In some examples, the lens may be stored in packaging solution. In some examples, the lens may be stored under controlled or reduced temperatures. At a later time, and in some examples at a remote location, a user may interact with a design system to choose a pattern 233 for the lens that they want to have patterned. At step 234, a colorant may be imparted to the lens base. There may be numerous manners to impart the colorant as discussed in proceeding sections which may include ink printing, photo-induced reactions or needle imprinting as examples. In some examples, at step 235, the colorized base may be coated with an encapsulating coat. In some examples, the encapsulating coat may be sprayed or otherwise coated onto the front curve surface of the lens only. In other examples, both the front curve and back curve surface may be coated, for example by dipping into a solution. In some examples, the encapsulant coat may be a monomer mixture which at step 236 may be polymerized. For the user's comfort, the polymerized and encapsulated colorized lens may be placed into packaging solution to hydrate the lens as shown in step 237.

Printing of Colorant onto Contact Lens

Referring to FIG. 2C, an illustration of printing pigment upon a contact lens is found. As shown in the illustration, in some examples an ink jet type printing head 240 may be used to print colorant upon the contact lens. The ink jet type printing head 240 may be moved 241 across the surface of the contact lenses in controlled means to establish a pattern of droplets 243 which will impinge upon the contact lens 244. There may be numerous types of biocompatible inks that may be useful for the ink jet print head. The ink jet print head may be controlled by a print controller which may incorporate sensing devices to establish the location of the print head and its rate of movement to calculate the correct timing of electrical signals to cause the printing head elements 242 to release a droplet of ink 243. In some examples, the controller may have an ability to perform an algorithmic calculation which may adjust the print pattern for various factors such as the curvature of the lens and for printing issues where one or more of the printing elements may not be dispensing ink. In some examples, the print head may be located on a stationary printer into which lenses for customization are place. In other examples, the printing mechanism may be located into the packing of the lens bases which will be customized.

Figure 2D:
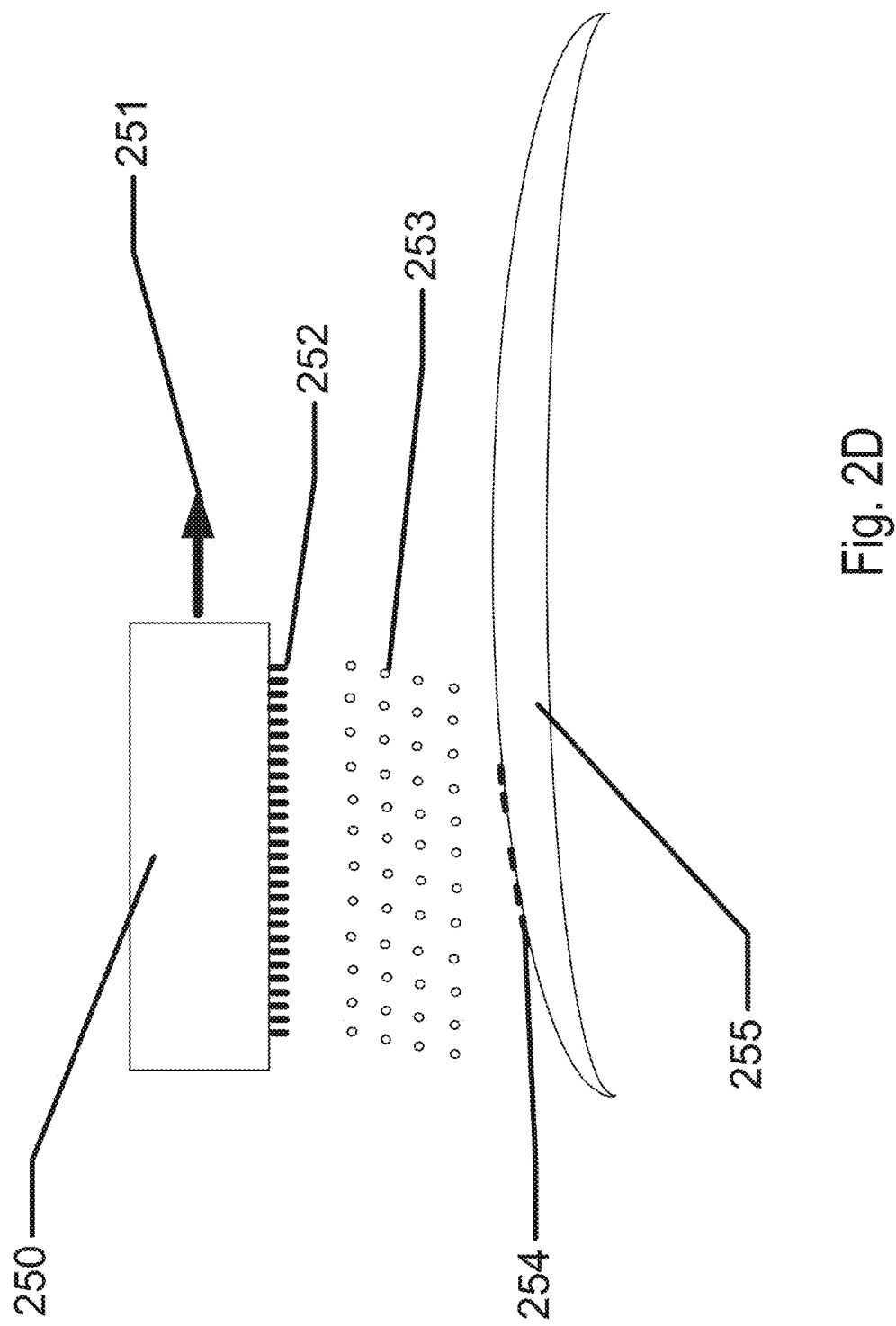
FIG. 2D illustrates a close-up view of an exemplary apparatus printing a coating layer upon the top surface of an exemplary lens with aesthetic characteristics.

Referring to FIG. 2D a second pass of printing may be performed to encapsulate the printed surface in a cover layer of lens material so that the colorant is buried beneath the surface. There may be numerous materials that may be consistent with encapsulating the printed surface including PVP or other materials as mentioned previously which impart a comfortable and hydrated surface to the user. Referring to FIG. 2D, a print head 250 may be moved 251 across the lens surface. As the print head 250 is moved 251 voltage signals may be sent to the print head which may cause the printing head elements 252 to release a droplet of ink 253 creating a pattern 254 on the surface of the lens. In some examples the same print head that printed the ink may use different releasing elements to release the encapsulating layer material across the surface of the lens. In other examples, a second print head may release the encapsulating material. In general, the encapsulating layer may be released onto the entire surface of the lens; therefore, a spray process may dispense the encapsulating material. In some examples, the dispensed material may be allowed to flow over the surface for a time period before it is polymerized. The polymerization may be chemically triggered or an initiating light source may be used to initiate polymerization. In some examples, the lens with polymerized layers may be next immersed into an aqueous liquid such as packaging solution to allow the top layers to be hydrated.

Figure 2E:
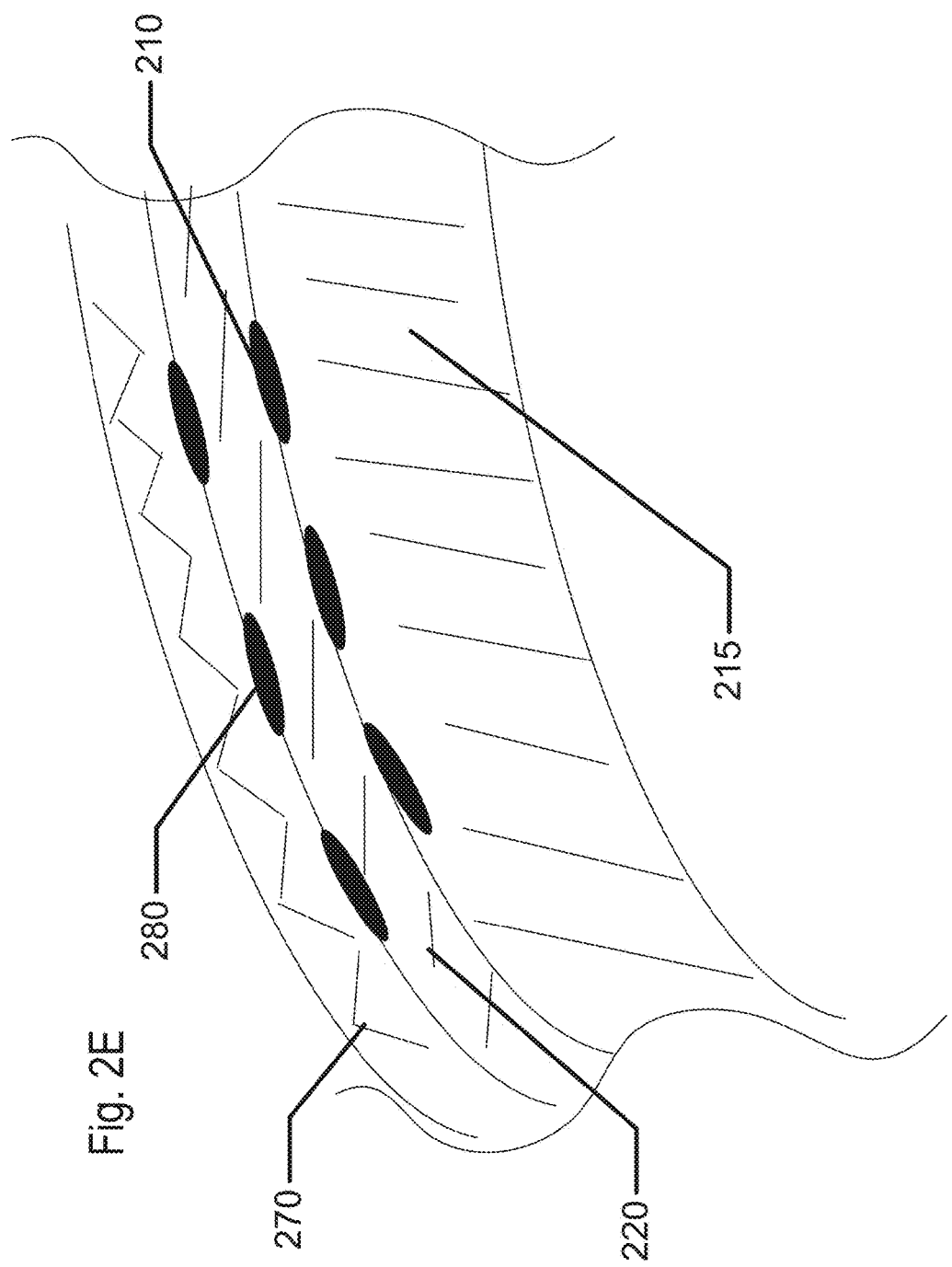
FIG. 2E illustrates a cross section close-up view of an exemplary lens with aesthetic characteristics comprising multiple layers.

Referring to FIG. 2E, an exemplary illustration of a multilevel pattern is provided. In some examples it may be desirable to print patterns on multiple levels of the lens body. Patterns on multiple levels may give the aesthetic pattern a feeling of "depth". In some examples, multilevel patterns may be formed by repeating the printing steps as laid out in relationship to FIG. 2A. Again a substrate may have color printed on the base layer. The color may include a black ink or other various colors that may be formed from inks, dyes and other colorants that are safe in the ocular environment. After the aesthetic element 210 is formed in or upon the base layer 215, it may be encapsulated by a top coating layer 220. Thereafter, another layer of colorant may be applied created a second aesthetic element 280. It may be encapsulated by another layer of a top coating layer 270. In general, any of the printing techniques herein may be configured to form patterns in multi-layer fashion to impart apparent depth to the patterns that result on the lens.

Distribution Models for Customized Aesthetic Lenses

Figure 3A:
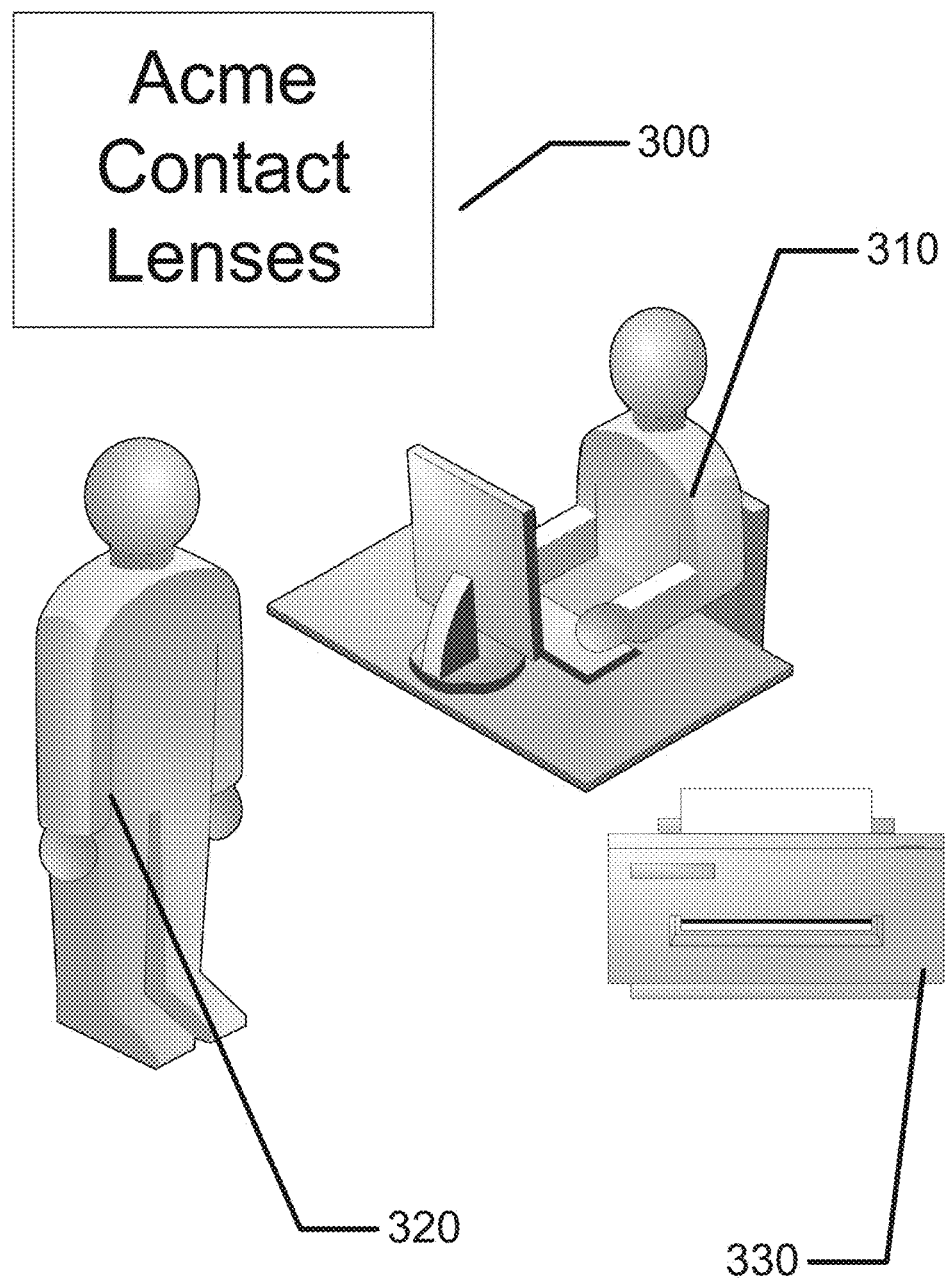
FIG. 3A illustrates an exemplary commercial location which offers digitally printed aesthetic lenses.

There may be numerous manners to make and distribute customized aesthetic lenses. In a first example, a commercial outlet may be established with a printing system capable of performing the printing of aesthetic characteristics as described herein. Referring to FIG. 3A, a commercial entity 300 may offer customized aesthetic lenses. A service agent 310 may interact with a customer 320. The service agent 310 may assist the customer 320 to determine the pattern that he or she desires. A printing system 330 located at the commercial outlet may then produce the customized lens.

Figure 3B:
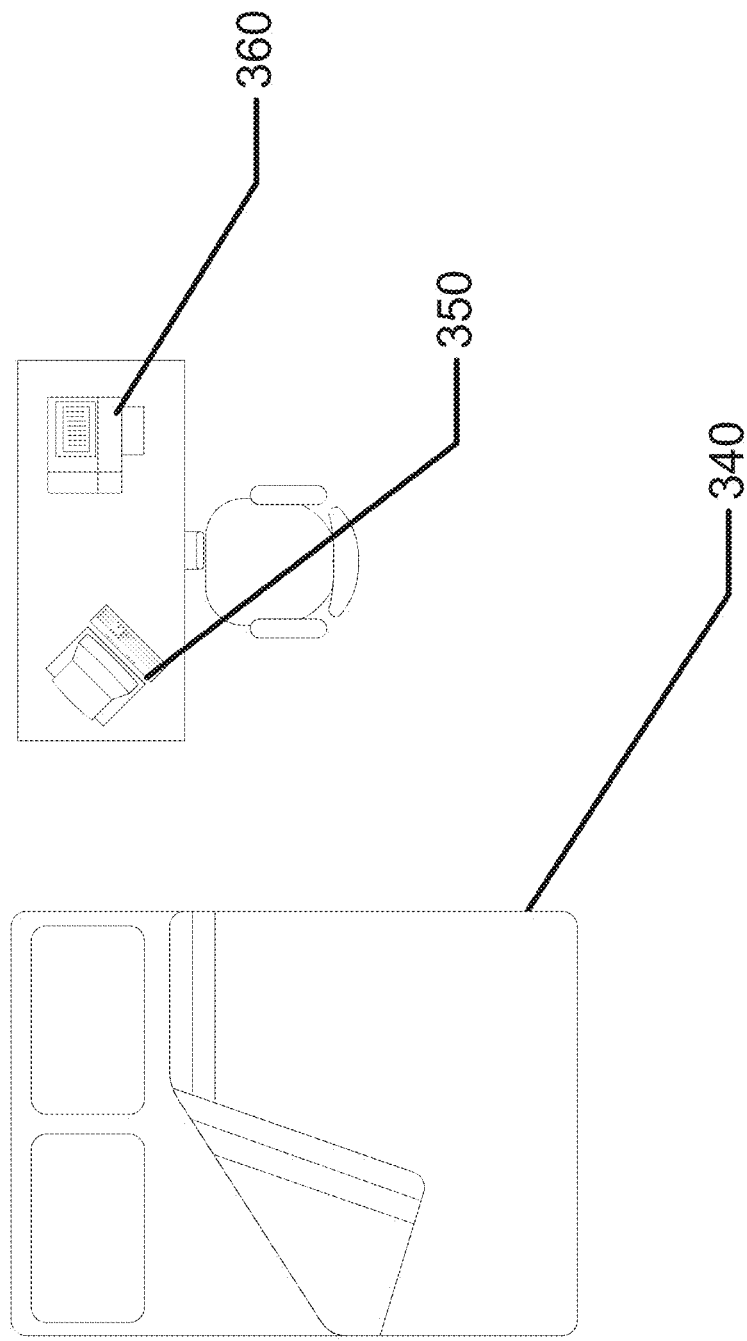
FIG. 3B illustrates an exemplary home location employing digital aesthetic lens printing apparatus.

In another model, a customized lens may be produced at a user's home. Referring to FIG. 3B, a printing system may be located in a user's house. For example, a printer 360 may be located in a user's bedroom 340. The user may interact with a design system on a personal computer, tablet or smart device 350. The user may be provided with blank lenses that are pre-fit and customized to the user's optical needs. Custom ink cartridges and encapsulating layer cartridges may also be obtained by the user. A communication between the personal computer, tablet or smart device 350 may send the desired pattern information to the printer. The user may perform basic steps with the printer to obtain a customized printed aesthetic lens.

A Packaged Aesthetic Lens Printing System

Figure 4:
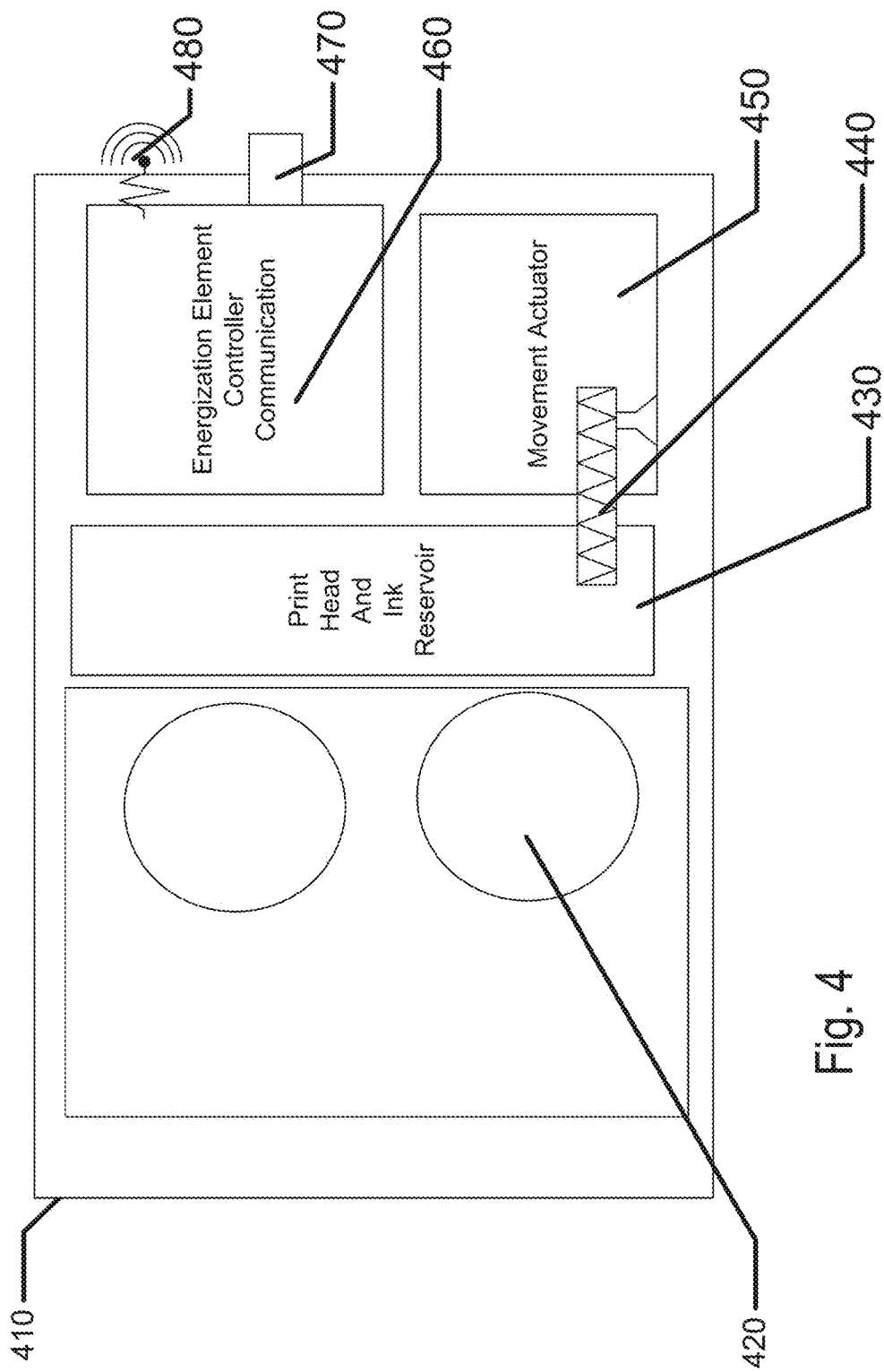
FIG. 4 illustrates an exemplary self-contained digital aesthetic lens printing apparatus.

In another model, a package may contain all the elements a user needs to print their customized lens. The package may have a set of blank lenses appropriate to a user. Referring to FIG. 4, a package 410 may contain a pair of blank lenses 420. The package 410 may contain the print head 430 with a pre-supplied type of ink and encapsulating material. The print head 430 may be moved within the package by a movement element 440. Movement of the print head may be actuated by elements such as small motors, for example precision stepper motors, connected to simple lead screws. In other examples, electroactive elastomers may be used to cause and control movement. In still further examples, piezo-electric actuators may be used to cause movement. Any movement device which may be powered by a battery device may be used to control the movement. Control of the movement element 440 may be made by a movement actuator element 450. The movement actuator element 450 may provide electrical signals such as high voltage signals in the case of elastomeric and piezoelectric based actuators or digital stepping signals or analog control signals for motor based movement. In the illustrated example, there is only one dimension of movement shown since the printing element may be large enough to span the lenses upon which the pattern is printed. In some other examples, two dimensions of movement may be enabled to allow a smaller print head to be rastered across the lenses in between being moved along the lenses. In other examples, the printing element may have small enough and dense enough printing elements that it may sit above lens elements and print in a static orientation. An energization element along with a controller and a communication element 460 which may control power distribution and also control signals to the print head as well as to the movement element if there is one may be found. The controller may have interconnection outside of the package to receive data corresponding to the pattern that is desired to be printed. Communication into the package of the pattern data may be made with a wired connection 470 or a wireless communication 480. The wired connection may be made via serial port connection such as USB or other serial communication schemes such as SPI or I2C as non-limiting examples. Wireless communication may be coordinated via numerous wireless standards such as Bluetooth, Zigbee, WiFi and other such protocols. The pattern data may in some examples be presented to the user on a touch screen mounted upon the package in some examples. A touch screen signal, or a communication through the various communication means mentioned may allow the user to start a print and may indicate when the processing is completed.

In some examples, the base contact lens elements may be stored in a dry condition and processed as a dry starting lens. In such cases the finished product may need to be hydrated before it may be worn by a user.

In some other examples, the lens blanks may be stored in an aqueous solution, and when the printing is to be performed, the liquid may need to be drained away from the lens body. In some examples, a drying period may be required before printing may begin. In some examples, draining of fluid may be accomplished by the direction that the packaging is placed where when then lens is placed on end, the lens blanks may be immersed in packaging solution whereas when in is laid flat, the fluid spreads out along the bottom of the package length and uncovers the lens blanks. In some other examples a valve may allow for the liquid to be drawn away from the lens blanks. In some other examples, a pump or an air flow may push the fluid away from or to the lens blanks depending on the need.

Photopatterning of Aesthetic Lenses

There may be numerous methods of creating a pattern on a contact lens by writing the pattern into the lens with light. Referring to FIG. 5A, an illustration of a photosensitive insert layer within a contact lens is depicted. A base contact lens layer 503 may be molded with standard contact lens hydrogel molding formulations. An insert layer comprising photoactive elements 501 may be sandwiched between the base contact lens layer 503 and a top contact lens layer 502. In some examples, the insert layer comprising photoactive elements 501 may be formed before the molding operation and then placed into a mold comprising the front contact lens optic shape and a back contact lens optic shape. Photopolymerizable material may be injected into the mold pieces and then the insert may be encapsulated into the lens by hydrogel material as illustrated. The photo-polymerizable material may be imbedded into an insert piece, and the insert piece layer may comprise thermoformable material allowing the insert to be shaped into the desired curve and shape of a contact lens.

In an example, the insert layer comprising photoactive elements 501 may have small features embedded, or adhered to the layer where each of the photoactive elements may comprise an amount of photochromic ink. There are numerous types of photochromic ink, some of which change color irreversibly upon exposure to ultraviolet light. The photochromic ink may be encapsulated in a polymer matrix and/or ground into small discrete pieces which may be spherically shaped as illustrated. Other shapes may be possible. Irreversible photochromic pigments such as OliKrom's hvOne pigments available from OliKrom company as a non-limiting example may be incorporated into the insert.

A molded blank comprising an insert with photochromic pigment may be transparent before any exposure to UV light. Thus, such a lens may be patterned by exposing it to ultraviolet light in patterns that correspond to the desired pattern. The exposure process is described in greater detail subsequently. The resulting pattern may be considered a monochrome pattern. In some examples, a multicolor pattern may be formed by including multiple layers of inserts where each of the insert layers may comprise a different colored photochromic dye. When there are multiple insert layers, laser irradiation of the insert layers at discrete wavelengths may allow for one of the multiple layers to be patterned. The encapsulating layer surrounding the photochromic dye may include absorbing dyes that may define narrow bands of UV light that may penetrate into the encapsulated photochromic dye. Thus, with multiple different imaging irradiation steps, each at a different wavelength of UV light multicolor patterns may also be imaged.

In some examples, a photochromic dye may be replaced with a thermochromics dye. In these cases, different thermochromics dyes may be mixed with absorbent materials, where the absorbent materials may absorb relatively narrow bands of electromagnetic radiation, such as in the UV band or spectrum. The absorption of the light by a discrete element filled with thermochromic dye may raise the local temperature significantly, thereby turning the dye from non-colored to colored. In some examples, the light may be formed by a laser light which may be scanned across the lens body and turned on when a pattern element is required. In other examples, a light source, which may be collimated, may irradiate a masking element across the projection of the light onto a lens and allow light to penetrate in designated areas. Again, the locations where light irradiates the lens may absorb the light energy and heat the photochromic dye yielding a pattern.

Figure 5B:
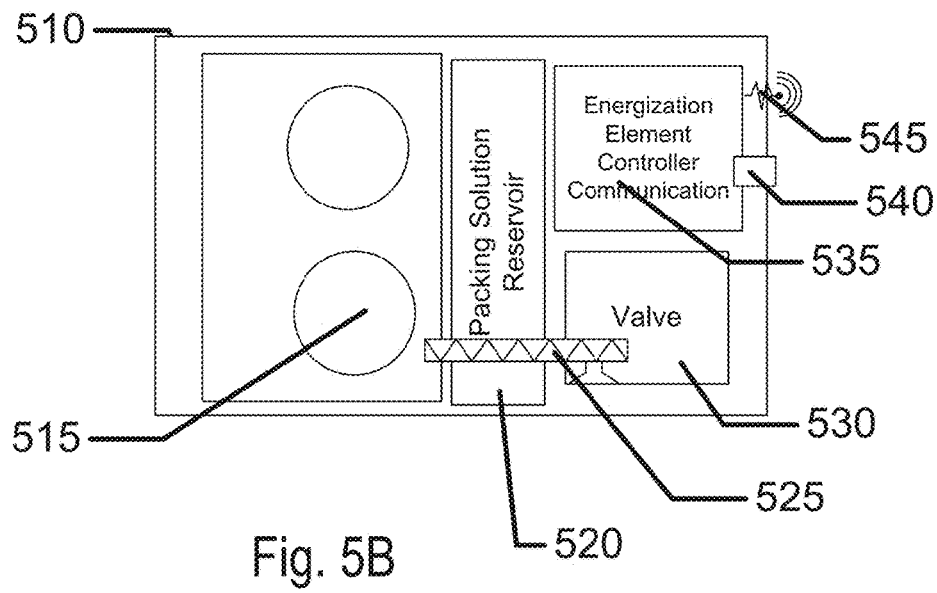
FIG. 5B illustrates an exemplary package for containing lens bases comprising photochromic or thermochromic dye.

Referring to FIG. 5B, a package 510 containing lens bases 515 for a user may be illustrated. In some examples, the lens bases may be clear lenses with no prescription or power to them. In other examples, the lens bases may have a unique prescription to them for the user. In order to pattern the lenses with good precision, the lens packaging solution may need to be drained away from the lens bases before irradiation. A reservoir 520 may be located within the package 510 to allow for the draining of the packing solution from the area of the lenses. In an example, an actuating mechanism 530 may actuate a valve 525 which may allow the packing solution to drain away from the lens bases and into a storage location. An energization element with a controller and a communication function 535 may control power distribution and also control signals to the valve actuator. The controller may have interconnection outside of the package to receive data corresponding to the pattern that is desired to be printed. Communication into the package may be made with a wired connection 540 or a wireless communication 545. The wired connection may be made via serial port connection such as USB or other serial communication schemes such as SPI or I2C as non-limiting examples. Wireless communication may be coordinated via numerous wireless standards such as Bluetooth, Zigbee, WiFi and other such protocols. The status of pattern writing may in some examples be presented to the user on a touch screen mounted upon the package. A touch screen signal, or a communication through the various communication means mentioned may allow the user to start a print and may cause the draining of aqueous solution.

Figure 5C:
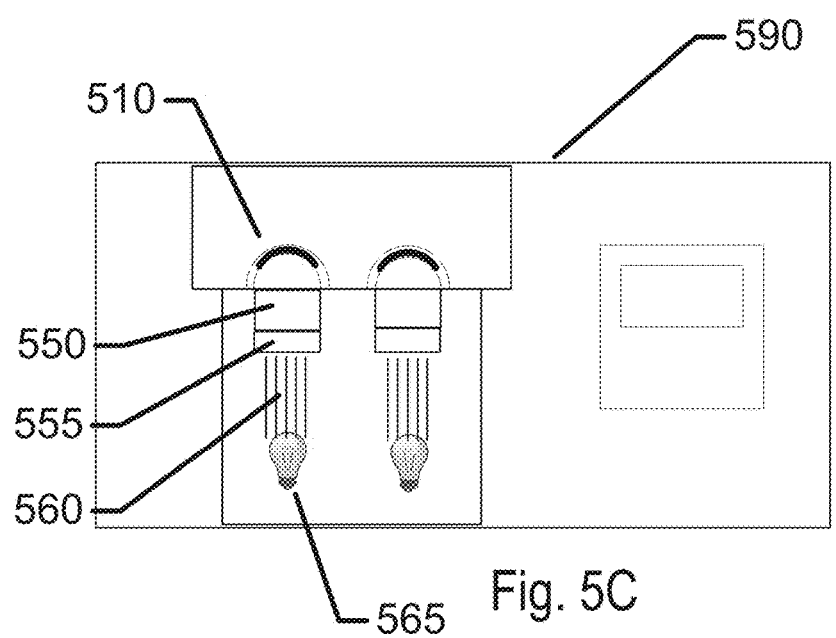
FIG. 5C illustrates an exemplary apparatus for creating an aesthetic characteristic in a lens comprising photochromic or thermochromic dye.

Referring to FIG. 5C, an exemplary irradiation apparatus 590 is illustrated. The package 510 or a similar one may be inserted into the irradiation apparatus 590 for a pattern to be written. The irradiation apparatus may have a UV irradiation source 565. The light emission from the UV irradiation source 565 may be collimated 560 in some examples. The collimated UV light 560 may then pass through an imaging element 555 which may image the light into pixels that are passed through to the lens and those that are not. The imaging element may comprise a DMD type mirror imaging device in some examples. In other examples, an imaging element may be formed from a liquid crystal device which may block light or let light through based on electrical control signals to electrodes that surround a region of liquid crystal. The electrodes may be formed into a pixel pattern that allows for the patterning of the photochromic or thermochromic elements in the contact lens. The UV light that emerges from the imaging element 555 may be focused in various manners with a focusing system 550 to allow the size of the image to be adjusted onto the lens bases.

Figure 5D:
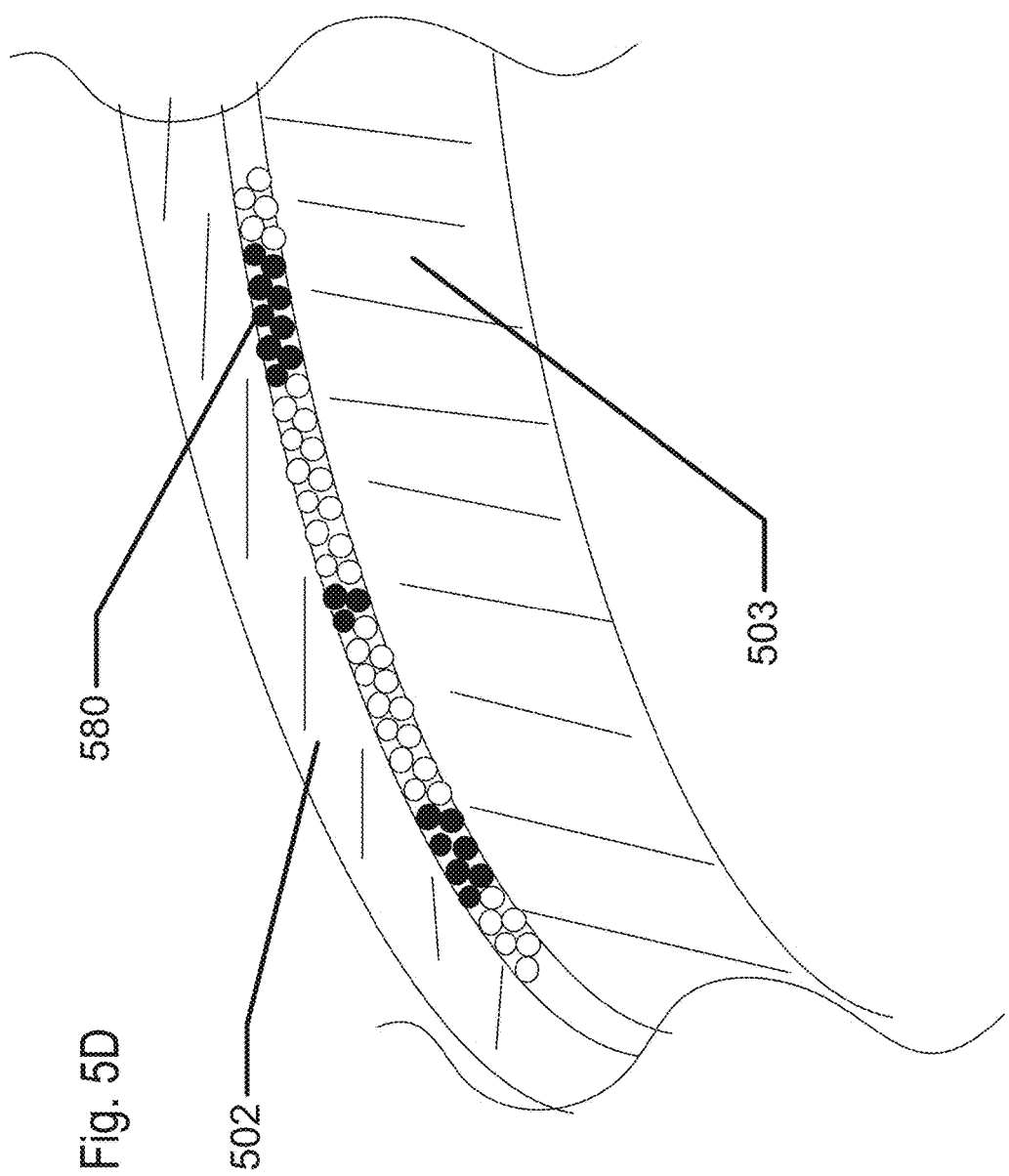
FIG. 5D illustrates an exemplary cross section view of a lens base comprising photochromic or thermochromic dye where some dye regions have been processed to have a color.

Referring to FIG. 5D, an example of imaged photochromic or thermochromic elements is illustrated. The lens encapsulating layers 502 and 503 may surround the insert in which are micronized photochromic or thermochromic elements as discussed. As shown as imaged photochromic or thermochromic elements 580, combinations of the elements may be imaged to create a pattern in the lens.

Needle Patterning of Aesthetic Lenses

Figure 6A:
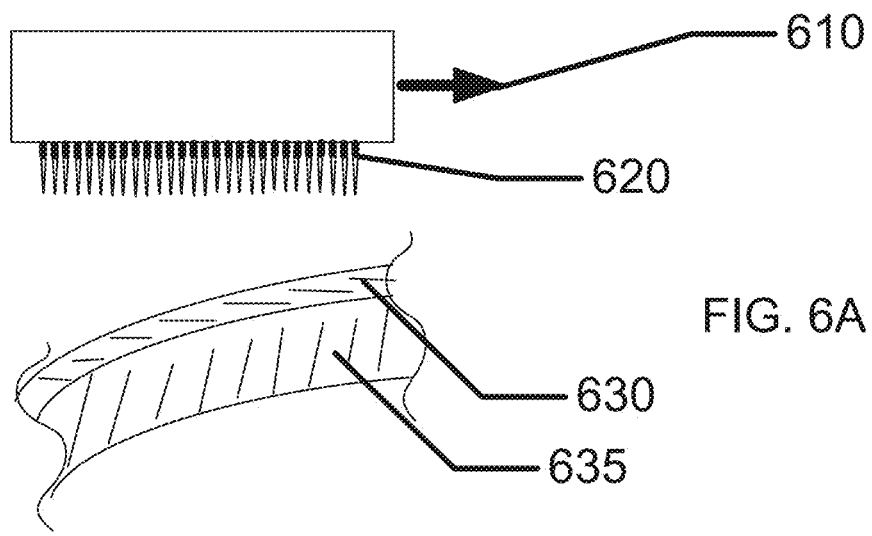
FIG. 6A illustrates an apparatus for conveying an aesthetic pattern to a contact lens using an array of needles.

Referring to FIG. 6A, a needle patterning device is illustrated. Needles may be used to both carry ink as well as to puncture the surface of a lens based that is meant to be patterned. In some examples, an array of needle heads may be attached upon elements capable of expanding length with the application of electrical signals. In some examples, the application of an electric potential may cause a needle to expand so that when the array of needles is brought in contact with a reservoir of ink, only those needles that have been expanded by the electrical signal will come in contact with the ink. At a later time, the array of needles may be pressed into the lens blanks. The needles with ink on them will transfer the ink into the lens base. By repeating the process numerous times, a pattern may be imparted into the lens base much as a tattoo is formed on human skin with needle penetration.

In other examples, the array of needles may all be at the same length when the array is brought in contact with ink. At a later time, electrical signals may be used to expand the length of the support for the needle. Those needles that are extended from the surface may be able to penetrate the lens base while the other needles may not penetrate the surface of the lens base. The supports for the needles may be formed of materials such as piezoelectric materials which can expand in length with applied voltage or of electroactive elastomeric materials which also may expand in the presence of electric potential.

In still further examples, a surface of the needles may be coated with materials that may make the needle's affinity for the ink low. Electrodes within the needle and the ink reservoir may allow for transformation of the wetting of a particular needle by application of an electrical potential to the needle. If the needle becomes hydrophilic on the application of electrical potential, then an array of needles can have selected needles coated with colorant. When the array is pressed into the lens base, those needles with ink may leave coloration in a pattern determined by the pattern of electrical potential applied to the needles. The array of needles may be stepped across the surface of the lens base to form a complete pattern.

Figure 6B:
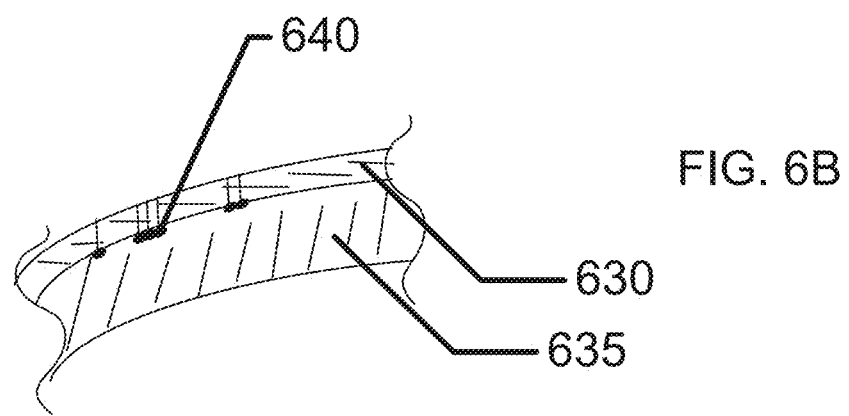
FIG. 6B illustrates an exemplary cross section of a lens base with color imbedded by needle processing.

When needles penetrate the surface and leave ink on the surfaces that the needle touch, it may be desirable to provide an encapsulating layer to cover the penetration holes. In some examples, a PVP containing monomer mixture may be sprayed or printed onto the lens base as describe in earlier sections. A thermal or photochemical polymerization of the monomer mixture may be used to fix the coating and effectively segregate the deposited ink within the body of the lens. In other examples, a top layer that the needles penetrate through may be formed to be partially gelled. After the needles penetrate the surface layer, the partially gelled layer may tend to fill in the hole by diffusion. The partially gelled layer may be fixed by further exposure to photochemical sources. Referring to FIG. 6A, the lens base layer 635 may support a top layer 630 of the lens. As mentioned in some examples the top layer 630 may be attached to the lens base 635 when the needles 620 penetrate the lens as they are moved into and out of the location of the lens base 635 as the array is moved 610 over the lens base 635. The top layer may be partially gelled as mentioned, or an extra amount of polymerizable material may be added to the lens. Either of these treatments may then be exposed to UV light to fix the polymerizable material. As illustrated in FIG. 6B, a deposit of colorant 640 may be buried into the lens base, providing coloration in a pattern.

Electroactive Aesthetic Patterned Lens

In some examples, it may be possible to create an aesthetic pattern on a contact lens based on an electroactive function within the lens itself. A contact lens with an embedded energy source such as a battery may have the ability to perform function based on the control of electrical energy. In an example, an array of liquid crystal diodes may be used to control the transmission of light and thereby create patterns. In some examples, a reflective surface may be located behind the liquid crystal devices so that incident light may be reflected back. As well the stack of elements may include polarizing filters which may be oriented at perpendicular angles. When electrical signals across electrodes that span the liquid crystal layer are activated they may cause a shift in the alignment of the liquid crystal molecules and begin to stop light from proceeding through the liquid crystal layer. By arranging the electrodes in a pattern and selectively determining which electrodes are activated and which are not, complex patterns may be formed in the non-optic zone of the lens. In some other examples, a low level light source may shine light from behind the liquid crystal devices. When they are energized, the light emitted may be absorbed. When the liquid crystal devices are not energized, light may proceed through liquid crystal layer and emerge from the contact lens giving the impression of lighted and dark pattern regions on the eye of the contact lens wearer. The contact lens may have an energy source such as a battery as well as electronic circuits which may control the application of electrical potential across the electrodes that space regions of liquid crystal. Portions of the circuit may be designed to receive wireless communication from an outside transmitter which may write a pattern into memory of the contact lens. The memory elements may be used to control the application of electrical potential across the pixels of liquid crystal material.

Figure 7A:
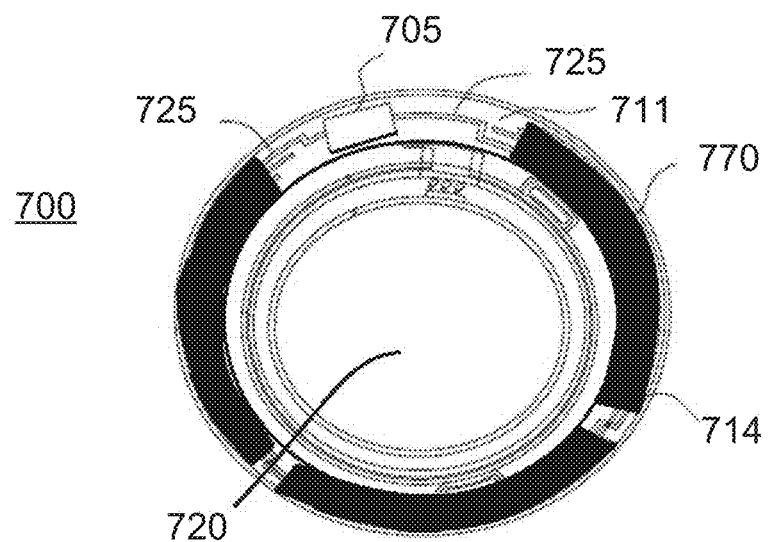
FIG. 7A illustrates an exemplary view of an insert device comprising an electroactive patterning device.

Referring to FIG. 7A, an example of a contact lens insert that may be used to create an electroactive pattern on the lens is depicted as contact lens insert 700. In the contact lens insert 700, there may be the array of electroactive patterning elements 770 that may accommodate forming patterns. A circuit 705 to provide controlling voltage signals as well as to provide other function such as controlling sensing of the environment for external control signals may be powered by an energization element such as a biocompatible battery element The energization elements may have various interconnect features to join together pieces as may be depicted underlying the region of interconnect 714. The energization elements may be connected to a circuit element that may have its substrate 711 upon which interconnect features 725 may be located. The circuit 705, which may be in the form of an integrated circuit, may be electrically and physically connected to the substrate 711 and its interconnect features 725. The electroactive patterning elements 770 may lie above these other components and may comprise a complete ring in the non-optic zone of the contact lens (even though for illustration the dark pattern is broken in places to allow underlying structure to be observed). The non-optic zone may be the region outside of the circular optic zone 720 which is the portion which a user may look through when the lens is worn.

Figure 7B:
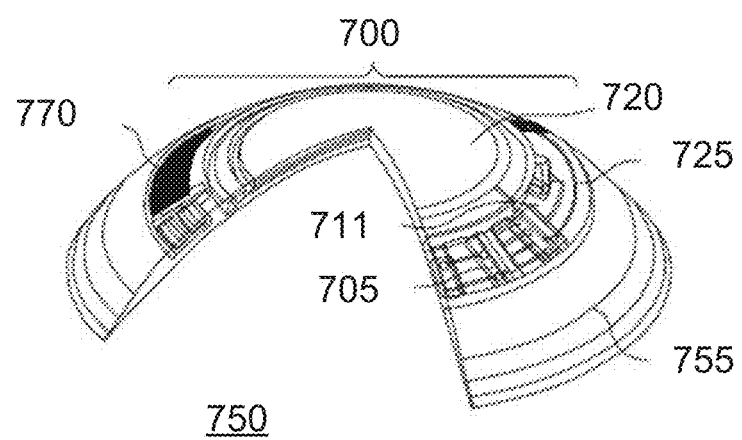
FIG. 7B illustrates an exemplary lens comprising the insert of FIG. 7A.

Referring to FIG. 7B, a cross sectional relief of a contact lens 750 may contain contact lens insert 700 and its discussed constituents. The contact lens insert 700 may be encapsulated into a skirt of contact lens hydrogel 755 which may encapsulate the insert and provide a comfortable interface of the contact lens 750 to a user's eye.

There may be numerous other types of patterning devices that may operate in an electroactive manner. In non-limiting examples, these may include electro-microfluidic pixel elements that switch a dark aqueous ink layer with a light oil layer to create patterns. In another example, miniature light emitting elements such as light emitting diodes may be formed into an extremely thin array with very small patterned electrodes to provide electrical signal to control light being emitted into intended patterns.

What is claimed is:

1. A contact lens pattern imaging device comprising:
   a receptacle configured to hold a package containing a pair of contact lens bases, wherein the contact lens base comprises an imbedded photochromic dye, and wherein the receptacle holds the pair of contact lens bases in an aligned location;
   a light source, wherein the light source is located within the contact lens pattern imaging device in a position to illuminate the pair of contact lens bases in their aligned positions;
   a light intensity modulator, wherein the light intensity modulator blocks portions of the light from the light source in a pattern;
   a controller, wherein the controller sends control information to the light intensity modulator to turn elements within the light intensity modulator on and off to form the pattern; and
   a communication device, wherein the communication device receives communication of data and passes it on to the light intensity modulator.

2. The contact lens pattern imaging device of claim 1 wherein the light source sources ultraviolet radiation.

3. The contact lens pattern imaging device of claim 2 wherein the light source sources multiple discrete bands of radiation in an ultraviolet region, and wherein the multiple discrete bands of radiation are used to pattern multiple different colors within the pattern in the contact lens.

4. The contact lens pattern imaging device of claim 1 wherein the light intensity modulator comprises a layer of liquid crystal material, wherein the layer of liquid crystal material lies between electrodes, and wherein an electrical signal applied to the electrodes modulates an intensity of light that passes through the imaging device in a region bounded by the electrodes.

5. The contact lens pattern imaging device of claim 1 wherein the light intensity modulator comprises a DMD device.

6. A contact lens patterning device comprising:
   a receptacle configured to hold a package containing a pair of contact lens bases, wherein the contact lens base comprises surface adherent to ink droplets;
   a first print head printing element, wherein the first print head printing element is located within the contact lens patterning device in a position to print directly upon the pair of contact lens bases in their aligned positions, and wherein the first print head printing element prints ink;
   a second print head printing element, wherein the second print head printing element is located within the contact lens patterning device in a position to print directly upon the pair of contact lens bases in their aligned positions, and wherein the second print head printing element prints a reactive monomer mixture;
   a controller, wherein the controller sends control information to the print head to turn elements within the print head on and off to form a pattern of ink droplets; and
   a communication device, wherein the communication device receives communication of data into the controller.

* * * * *